United States Patent
Pendleton, Jr.

(10) Patent No.: US 6,253,186 B1
(45) Date of Patent: Jun. 26, 2001

(54) METHOD AND APPARATUS FOR DETECTING FRAUD

(75) Inventor: E. Steele Pendleton, Jr., Blythewood, SC (US)

(73) Assignee: Blue Cross Blue Shield of South Carolina, Columbia, SC (US)

( * ) Notice: Subject to any disclaimer, the term of this patent is extended or adjusted under 35 U.S.C. 154(b) by 0 days.

(21) Appl. No.: 08/696,615

(22) Filed: Aug. 14, 1996

(51) Int. Cl.⁷ .................................................. G06F 17/60
(52) U.S. Cl. ........................ 705/2; 705/1; 705/3; 705/7; 705/10; 705/11
(58) Field of Search .................. 705/1, 2, 3, 7, 705/10, 11

(56) References Cited

U.S. PATENT DOCUMENTS

| | | | |
|---|---|---|---|
| 4,658,370 | * | 4/1987 | Erman et al. ............... 706/60 |
| 4,803,641 | * | 2/1989 | Hardy et al. ............... 706/60 |
| 4,858,121 | * | 8/1989 | Barber et al. .............. 705/2 |
| 5,054,096 | | 10/1991 | Beizer ..................... 345/2 X |
| 5,253,164 | | 10/1993 | Holloway et al. .......... 705/2 |
| 5,325,293 | | 6/1994 | Dorne ..................... 705/2 |
| 5,359,699 | * | 10/1994 | Tong et al. ............... 395/22 |
| 5,444,819 | * | 8/1995 | Negishi ................... 705/7 X |
| 5,471,382 | * | 11/1995 | Tallman et al. ........... 705/2 |
| 5,486,999 | | 1/1996 | Mebane ................... 705/2 |
| 5,517,405 | * | 5/1996 | McAndrew et al. ......... 705/2 |
| 5,532,928 | * | 7/1996 | Stanczyk et al. .......... 705/7 |
| 5,557,514 | * | 9/1996 | Seare et al. .............. 364/401 |
| 5,577,169 | * | 11/1996 | Prezioso .................. 395/61 |
| 5,627,973 | * | 5/1997 | Armstrong et al. ......... 705/10 |
| 5,706,441 | * | 1/1998 | Lockwood ................. 705/3 |
| 5,724,488 | * | 3/1998 | Prezioso .................. 395/61 |
| 5,732,397 | * | 3/1998 | DeTore et al. ............. 705/1 |
| 5,790,645 | * | 8/1998 | Fawcett et al. ............ 379/189 |
| 5,802,255 | * | 9/1998 | Hughes et al. ............. 395/75 |
| 5,822,741 | * | 10/1998 | Tong et al. ............... 395/22 |
| 5,919,226 | * | 10/1998 | Gopinathan et al. ........ 705/1 |
| 5,956,716 | * | 9/1999 | Kenner et al. ............. 707/10 |

FOREIGN PATENT DOCUMENTS

| | | | | |
|---|---|---|---|---|
| 509948 | * | 10/1992 | (EP) . | |
| 681249 | * | 11/1995 | (EP) | ............... G06F/17/60 |
| WO 94/06103 | * | 3/1994 | (WO) . | |

OTHER PUBLICATIONS

"A New Generation of Health Care Applications", Health Data Management Journal, Thomson Publishing, Chicago, IL ,(312) 913 1334, Apr. 1, 1996.*

Borzo, Greg; Smart–Bombing fraud;insurers turn to powerful new computer tools to spot "aberrant" claims (includes glossary); Americal Medical News; v37; n38;p3(4), Oct. 10, 1994.*

Emigh, Jacqueline; CSC Exchange: artificial intelligence has hit the mainstream; Newsbytes, Apr. 15, 1992.*

(List continued on next page.)

Primary Examiner—Vincent Millin
Assistant Examiner—Pedro R. Kanof
(74) Attorney, Agent, or Firm—Barnes & Thornburg

(57) ABSTRACT

A computerized arrangement for detecting potentially fraudulent suppliers or providers of goods or services includes a processor, a storage device, an input device for communicating data to the processor and storage device, and an output device for communicating data from the processor and storage device. The storage device includes a claims data file for storing information relating to a plurality of claims submitted for payment by a selected supplier or provider, one or more encoding lookup tables for use with the claims data file to produce an encoded claims data file, and a neural network program for analyzing the encoded data to produce an indicator of potentially fraudulent activity. The indicator may be compared to a predetermined threshold value by the apparatus or method to identify fraudulent suppliers. In addition to the neural network, at least one expert system may be used in the identification process.

36 Claims, 32 Drawing Sheets

OTHER PUBLICATIONS

Richter, M.J.; Smart machines and the fight against medical fraud; Governing; v7; p84, Apr. 1994.*

Stafford, Sue P., "Software for the Detection of Fraudulent Medical Insurance Claims: Answers and Issues", Comput. Professionals for Social Responsibility, (Jul. 28, 1990), pp. 203–218, Jul. 1990.*

"Supercomputer Center Used in Fight Against Fraud", Newsbytes News Network, (Jan. 31, 1996), 2 pp.*

Houlder, Vanessa, "War on Suspicious Payments—Vanessa Houlder on Visa's New Fraud–Fighting Method", Financial Times, London Edition, (Feb. 7, 1995), p. 15.*

Manchester, Philip, "Survey of A–Z of Computing (15): New Ways to Cope with Fuzzy Data—Neural Networks", Financial Times, London Edition, (Apr. 26, 1994), p. 12.*

Hollreiser, Eric, "Pa. Blud Shield Hires Ex–cop to Fight Fraud", Phil Business Journal, vol. 15, No. 8, (Apr. 19, 1994), p.3B.*

"UK—Insurance Fraud Computer System", Newsbytes News Network, (Nov. 15, 1993), 2. pp.*

"Neural Networks to be Tested on Claims' Payments", Electronic Claims Processing Report, vol. 3, No. 16, (Aug. 7, 1995), 3 pp.*

Weisberg, Herb and Tom Marx, "A Scientific Approach for Detecting Fraud", Best's Review / Property–Casualty Insurance Edition, vol. 95, (Aug. 1994), pp. 78–81.*

* cited by examiner

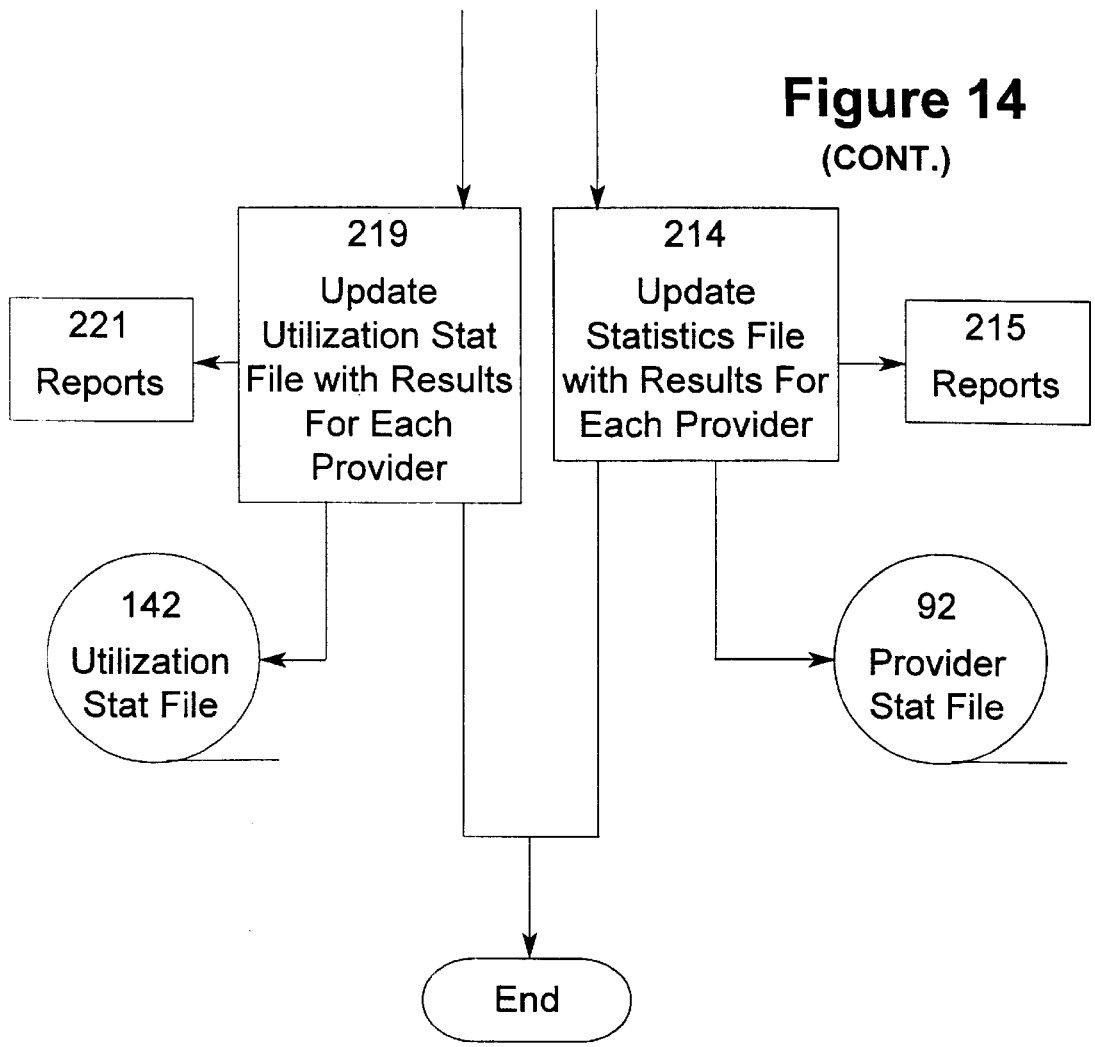

Figure 23

| | | |
|---|---|---|
| Network: pen.nnd | | |
| 04/17/19XX | | |
| Supplier | Lines | Avg. FI |
| 0000000001 | 3 | 0.6361 |
| 0000000002 | 1 | 0.4550 |
| 0000000003 | 4 | 0.5056 |
| 0000000004 | 1 | 0.9797 |
| 0000000005 | 2 | 0.9524 |
| 0000000006 | 2 | 0.8815 |
| 0000000007 | 6 | 0.7098 |
| 0000000008 | 2 | 0.9683 |
| 0000000009 | 1 | 0.9867 |
| 0000000010 | 2 | 0.9548 |
| 0000000011 | 3 | 0.4628 |

| |
|---|
| Good Suppliers: 885 |
| Bad Suppliers: 11 |
| Total Suppliers: 896 |
| Claim Lines: 5254 |
| Bad Threshold: 0.4500 |

METHOD AND APPARATUS FOR DETECTING FRAUD

FIELD OF THE INVENTION

The present invention relates generally to a computer method and apparatus for analyzing the billing patterns of providers and suppliers of goods and services and, more particularly, to a computer method and apparatus for differentiating between the billing patterns of fraudulent and non-fraudulent providers and suppliers.

BACKGROUND OF THE INVENTION

In many industries, large numbers of providers and suppliers of services and goods are employed. For example, in the health care industry, a large number of providers of medical services and suppliers of medical and related goods are involved in the delivery of health care to a given population. Certain entities, such as insurors, government payors and others must often process and pay large numbers of claims submitted by these providers and suppliers in relatively short time periods. The existence of, and the potential for, abuse of existing administrative systems by fraudulent providers or suppliers is a problem which exists in the health care setting, and in other analogous settings as well.

An objective of the present invention is to provide an automated system for processing a large number of claims submitted to a payor to identify patterns in the claim data which may be indicative of a fraudulent provider or supplier. Another objective of the invention is to provide such a system which is capable of processing claim data and identifying a potentially fraudulent provider or supplier before payments of suspect claims are made.

A preferred embodiment of the invention utilizes two popular classes of artificial intelligence: neural networks and expert systems. A neural network is a computer program which attempts to model, albeit crudely, the workings of the human brain. Neural networks are trained by example and generally excel at tasks involving pattern recognition. Expert systems are rules-based systems that deduct a solution or answer to a problem based on a series of "if . . . then" statements. An expert system attempts to mimic the deductive reasoning that an expert would employ in solving a given problem.

SUMMARY OF THE INVENTION

The present invention achieves the above-stated and other objectives by providing a computerized method and apparatus for detecting potentially fraudulent suppliers or providers of goods or services. An embodiment of the subject method comprises the steps of: a) collecting data on a plurality of suppliers and providers, including data relating to claims submitted for payment by the suppliers and providers; b) processing the data to produce a fraud indicator for at least one of the suppliers and providers; and c) determining, using the fraud indicator, whether the selected supplier or provider is a potentially fraudulent supplier or provider.

The step of collecting data further includes the steps of: periodically accessing claim data submitted by a selected supplier or provider; determining whether the claim data is of a type which can be processed in the processing step; and extracting selected claim data and storing the data in a claim file. The step of extracting selected claim data includes the step of omitting data relating to claims that would in any event not be paid. The step of determining whether the claim data is of a type which can be processed may include the step of examining an HCPCS (Health Care Procedure Code System) code associated with the claim data. This step may also include the step of determining whether a neural network used in the processing step has been trained to process the claim data.

The step of processing the data preferably includes the steps of: selecting elements of information from the data stored in the claim file; encoding the selected elements of information to produce an encoded claim file; and storing the encoded claim file. The encoded claim file is preferably sorted by supplier or provider code to produce a sorted, encoded claim file. The processing step further comprises the steps of reading data from the sorted encoded claim file, and analyzing this data by means of a neural network to produce the fraud indicator for the selected supplier or provider. In a preferred embodiment, the analyzing step includes producing a plurality of fraud indicators based on a plurality of claims submitted by the selected supplier or provider, and computing a composite fraud indicator from the plurality of indicators. In at least one embodiment of the invention, the composite fraud indicator is computed by averaging a plurality of fraud indicators for the selected provider or supplier.

The determining step preferably includes the step of comparing the composite fraud indicator to a predetermined threshold indicator value. Alternatively, one or more of the individual fraud indicators may be compared to predetermined threshold indicator value(s) as part of the determining process.

The individual or composite fraud indicators may be stored in at least one of a database file and a statistics file. An optional report may be produced to document the results of the collecting, processing, and determining steps.

In one embodiment of the invention, the processing step includes the step of analyzing the data by means of a neural network to produce the fraud indicator for the selected supplier or provider. The determining step may also include at least one of the following additional steps: a) performing an analysis of previously stored statistical information relating to the subject supplier or provider; b) performing a neural network analysis of the subject supplier or provider physical characteristics; and c) performing an analysis of statistical utilization data relating to the subject supplier or provider. An expert system may be used in one or more of these analyses. The method preferably includes the additional step of periodically refining a set of rules associated with the expert system in response to actual data relating to fraudulent suppliers or providers detected by the computerized method. The subject method may also include the step of periodically updating the neural network used to perform the analysis of supplier or provider physical characteristics, as well as the neural network used to produce the fraud indicator for the selected supplier or provider.

One embodiment of an apparatus for detecting potentially fraudulent suppliers or providers of goods or services in accordance with the invention comprises a processor, a storage device, input means for communicating data from an input device (such as, a keyboard or mouse) to the processor and storage device, and output means for communicating data from the processor and storage device to an output device (such as, a screen or printer). The storage device is preferably configured to contain at least a claims data file for storing information relating to a plurality of claims submitted for payment by a selected supplier or provider, encoding lookup tables for use with the claims data file to produce an encoded claims data file, and a neural network program, and means for processing the data in the encoded claims data file to produce an indicator of potentially fraudulent activity by the selected supplier or provider. The apparatus may further comprise means for comparing the indicator produced by the neural network program to a predetermined threshold value. The subject apparatus may also include means for sorting the encoded claims data file by supplier or provider prior to analysis by the neural network program.

In a preferred embodiment, the storage device is further configured to include a neural network data base file for storing data relating to potentially fraudulent suppliers or providers. The storage device may also include a statistics file for storing statistical data relating to the selected supplier or provider, and a program for producing a statistical screening file from data contained in the neural network data base file and the statistics file.

The subject storage device may further be configured to contain a supplier/provider application file for storing data relating to the physical characteristics of the selected supplier or provider. A program is preferably stored in the storage means for producing a physical traits analysis file from data contained in the neural network data base file and the supplier/provider application data file. Encoding lookup tables may also be provided for use with the supplier/provider application data file to produce an encoded supplier/provider application data file. In one embodiment, the program means for producing the physical traits analysis file comprises a neural network program for analyzing the data in the encoded supplier/provider application data file.

The storage means may also include a supplier/provider application data base for storing information relating to supplier/provider utilization, and a program for producing a utilization screening file from data contained in the neural network data base file and the supplier/provider application data base. This program may include at least one expert system component. The program may also include means for conducting a fuzzy logic analysis to produce a fraud prediction relating to the selected supplier or provider.

The apparatus of the present invention may also include means for training the neural network program for analyzing new data contained in the encoded claims data file.

Another embodiment of an apparatus for detecting potentially fraudulent suppliers or providers of goods or services comprises a processor, a storage device, input means for communicating data from an input device to the processor and storage device, and output means for communicating data from the processor storage device to an output device. In this embodiment of the invention, the storage device comprises a neural network database file for storing data relating to potentially fraudulent suppliers or providers, and at least one of the following files: (i) a physical traits analysis file for storing application data relating to a plurality of suppliers and providers, (ii) a statistical screening file for storing statistical data relating to potentially fraudulent suppliers or providers, and (iii) a utilization screening file for storing historical data relating to a plurality of suppliers or providers. The storage device further is configured to include a program for processing information from the neural network database file, and at least one of the physical traits analysis file, the statistical screening file and the utilization screening file, to identify potentially fraudulent suppliers or providers. The program may also include an expert system, and the storage device may further contain a plurality of expert system rules.

Embodiments of the apparatus of the present invention may also include means for updating the physical traits analysis file, the statistical screening file and/or the utilization screening file, as well as means for producing and updating the neural network database file.

Other goals, advantages and novel features of the present invention will become apparent from the following detailed description of the invention when considered in conjunction with the accompanying drawings.

BRIEF DESCRIPTION OF THE DRAWINGS

FIG. 23 illustrates a portion of a report of the type which might be produced by the method and apparatus of the present invention.

DETAILED DESCRIPTION OF THE DRAWINGS

Figure 1:
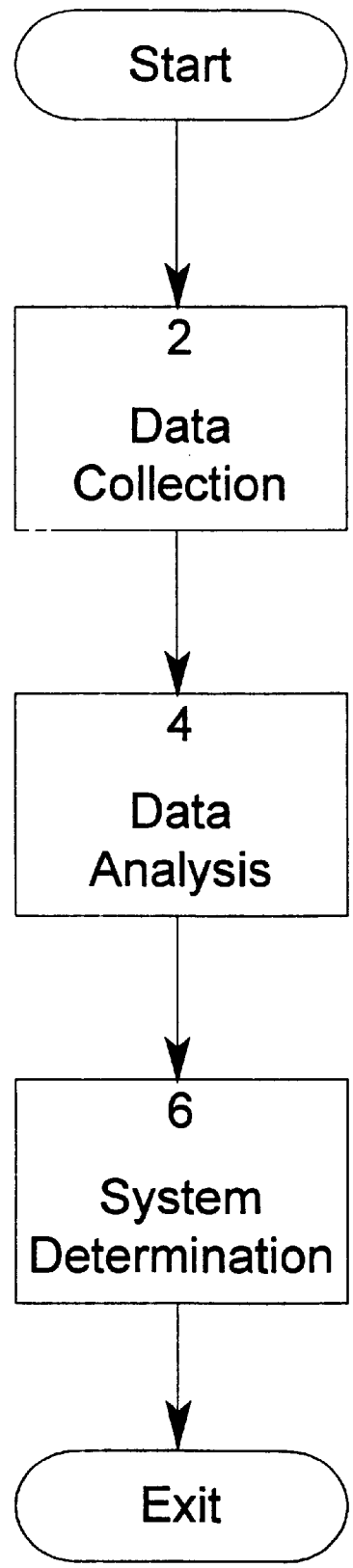
FIG. 1 shows a flow chart which illustrates the overall operation of the method and apparatus of the present invention.

FIG. 1 shows a flow chart which illustrates the overall operation of the method and apparatus of the present invention. The invention includes a data collection function (block 2), a data analysis function (block 4), and a system determination function (block 6). Each of these functions are described in additional detail below. It is to be understood that the following discussion is presented for purposes of illustration and example only, and not for purposes of limiting the scope of the claims. Specifically, the scope of the claims are not intended to be limited to the particular details of the following discussion.

Figure 2:
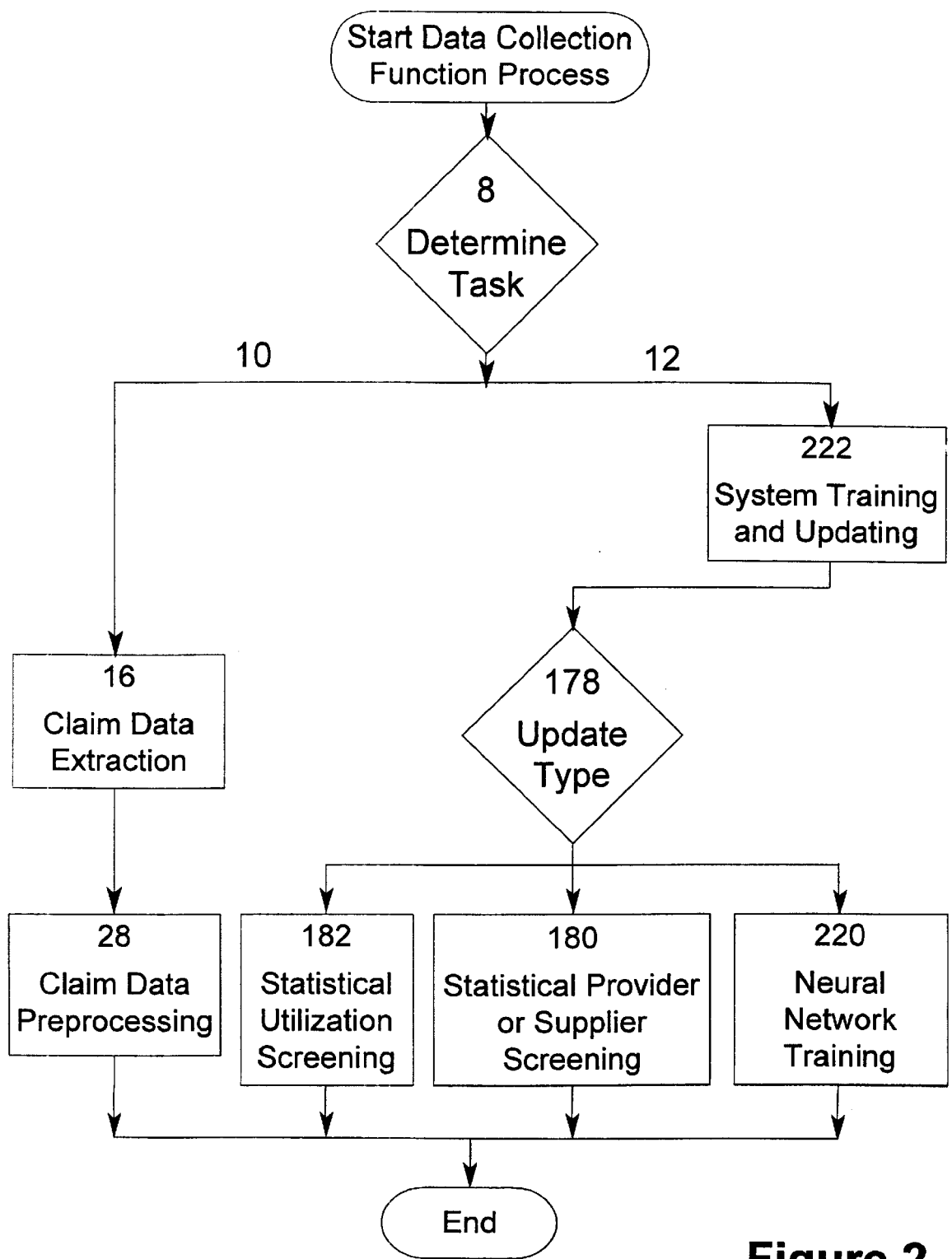
FIG. 2 shows a flow chart which illustrates the data collection function process of FIG. 1 in additional detail.

FIG. 2 further illustrates the data collection function of block 2. With reference to FIG. 2, the system first determines the task to be performed (block 8). The options available in this preferred embodiment include a "production" function, indicated by the branch of the flow chart of FIG. 2 identified generally by reference numeral 10, and a training and updating function indicated by the branch of the flow chart identified generally by reference numeral 12. "Production" runs of the system may take place on a regular basis, such as daily, weekly, monthly, etc. In this particular embodiment, daily execution is contemplated and is represented by process block 14.

Figure 3:
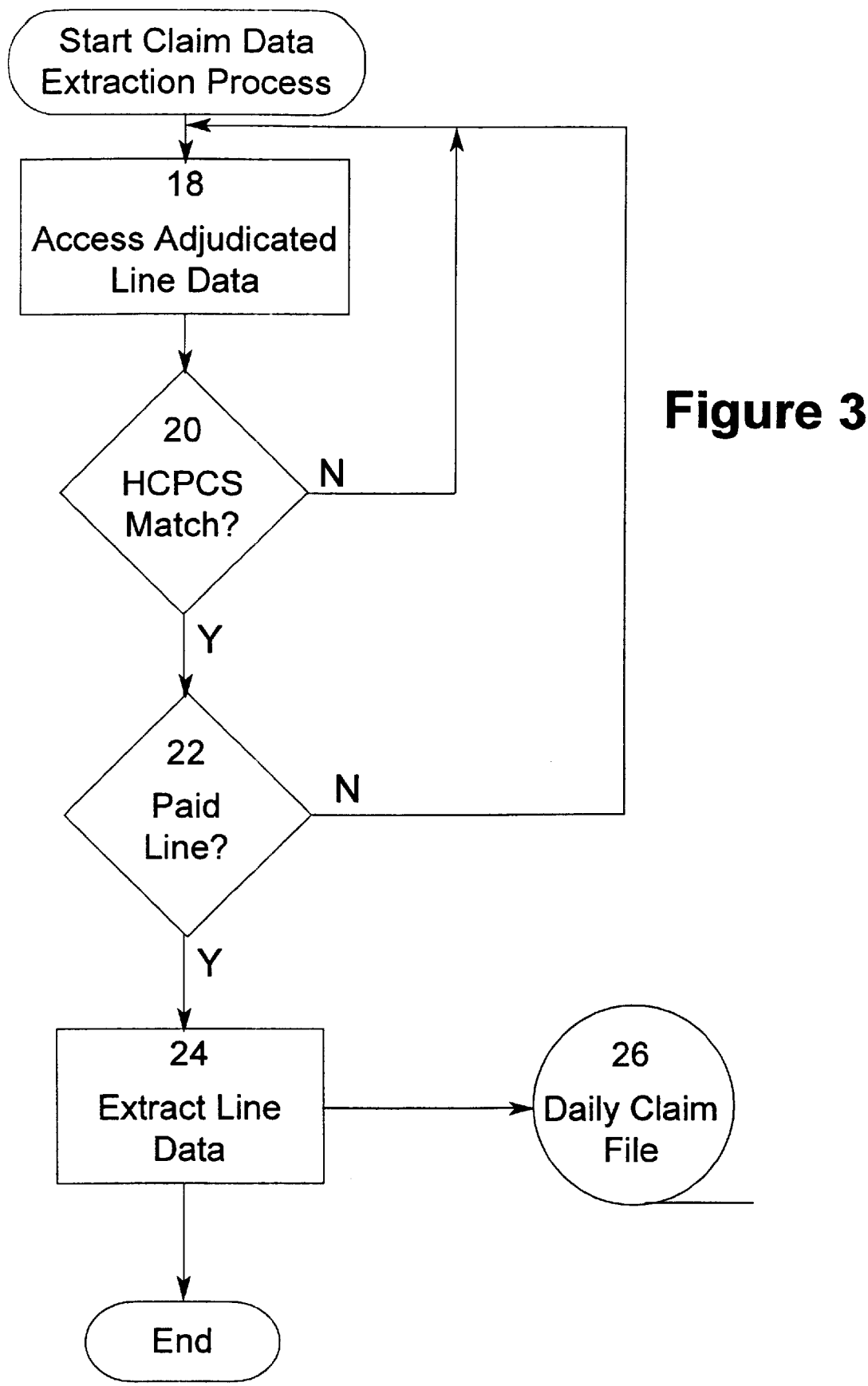
FIG. 3 shows a flow chart which illustrates a claim data extraction process which is part of the process illustrated in the flow chart of FIG. 2.

The first step in a periodic production run of the system involves claim data extraction. This step is generally represented by block 16 of FIG. 2. The process of block 16 is illustrated in additional detail in the flow chart of FIG. 3. With reference to FIG. 3, this process begins by accessing adjudicated line data (block 18). For purposes of the following discussion, the term "line" is used to represent a request for money to be paid in return for a product or service. A claim filed by a supplier or provider of goods or services may contain a number of "lines" representing a like number of goods or services supplied or provided. (The terms "supplier" and "provider" are used interchangeably in the following discussion.) Adjudicated line data represents claim lines that have been processed to completion. That is, a determination has been made as to whether a particular request or "line" is to be paid or denied. The system then determines, in block 20, whether the system is capable of processing the particular claim. This is done by determining whether or not there is an "HCPCS" code match. HCPCS is an acronym for Health Care Procedure Code System. An HCPCS code is present in each claim line to identify the particular type of product or service which is the subject of that line. In block 20, the system determines whether the neural network has been trained to recognize patterns associated with the particular code in question. If so, data flow proceeds to block 22. If not, the particular line in question is passed over and the system accesses the next adjudicated line.

In block 22, the system determines whether or not a determination to pay the subject line was made in the adjudication process. If it was determined that the subject line would not be paid, this line is passed over and the next adjudicated line is accessed. The system thus skips lines that would not be paid anyway which has the effect of lowering the level of "noise" in the system. If the system determines that there is an HCPCS code match on an adjudicated line which is to be paid, then that line data is extracted (block 24) and stored in a daily claim file 26.

Although labeled "daily" claim file 26 in this illustrative example, other periods (e.g., weekly, monthly, etc.) can be employed. Daily claim file 26, is the end product of the step of the claim data extraction process represented by block 16 of FIG. 2.

Figure 4:
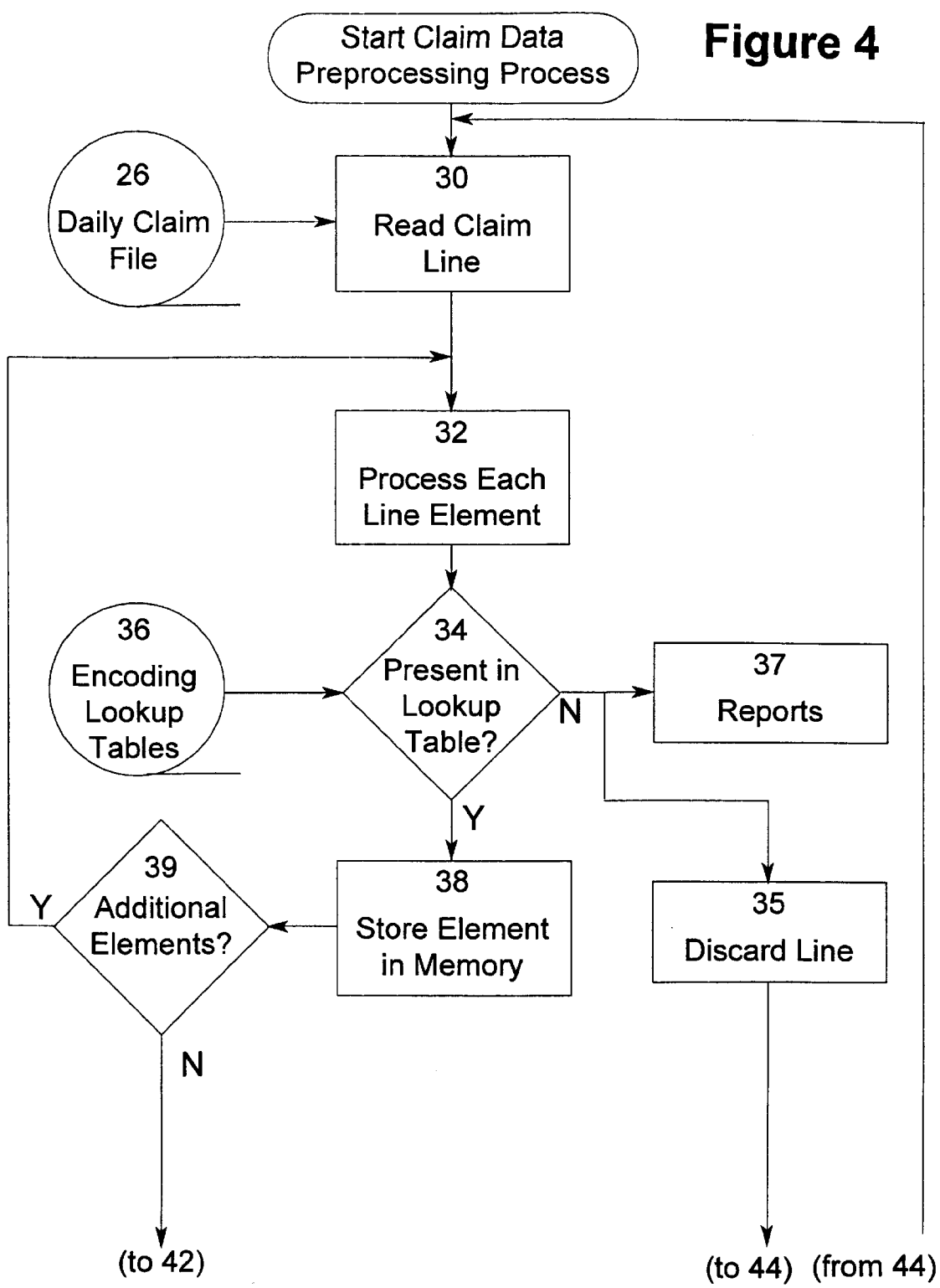
FIG. 4 shows a flow chart which illustrates a claim data preprocessing process which is part of the data collection function process illustrated in FIG. 2.
Figure 4:
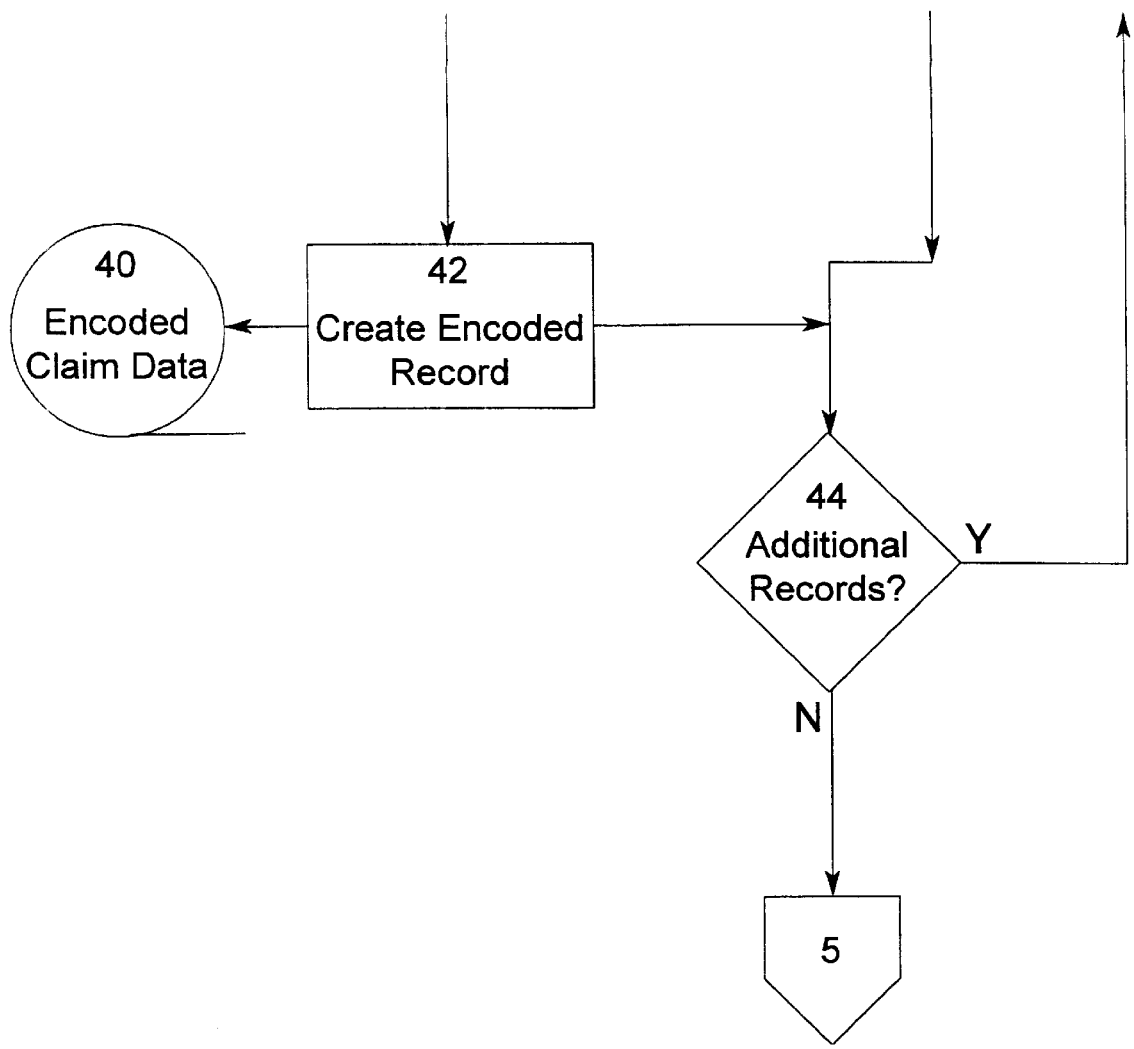

After construction of claim file 26, the system of FIG. 2 proceeds to the claim data preprocessing step (block 28). This process is illustrated in additional detail in the flow chart of FIG. 4. With reference to FIG. 4, claim data preprocessing begins by reading a claim line from daily claim file 26. This operation is represented by block 30 in FIG. 4. Each claim line comprises a number of different pieces of information or "elements". These elements may include the HCPCS code, other codes, dates, units, pricing information, total dollar amount requested, or other information. In the system of the present invention, several elements may be of interest. Block 32 represents the beginning of processing of each line element of interest to the system. The process proceeds to block 34 where a determination is made as to the presence of the particular element of interest in encoding lookup tables 36. Encoding lookup tables 36 are generated in a portion of the system illustrated in FIG. 16 which is discussed in detail below. If the element of interest is not present in the lookup tables, the system discards the line (block 35) and proceeds as indicated to the next line of interest. The system may optionally produce a report 37 listing the elements processed which are not present in encoding lookup tables 36, If, for example, a new HCPCS code appears as an element in a claim line, and the system has not previously been trained to process information relating to that code, the subject report will so indicate. This provides an indication as to how up-to-date the system is at a given point in time and assists in determining when retraining must occur.

If the subject line element of interest is present in the encoding lookup tables, the system stores the element in memory (block 38) and repeats the process for each element in the line (block 39). If all elements of a line are found in the lookup tables, the system creates encoded claim data file 40 in a process represented by block 42. Following creation of the encoded record, the system determines whether additional records are to be processed (block 44). If so, the next line is read from daily claim file 26 and processed as described above. After each element of interest in every line stored in daily claim file 26 is processed, the system proceeds with a sort operation represented by block 46 of FIG. 5. The data in encoded claim data file 40 is sorted (for example, by provider or supplier number) to produce sorted encoded claim file 48. Claim file 48 is used by the system as discussed below in connection with FIG. 7.

Figure 5:
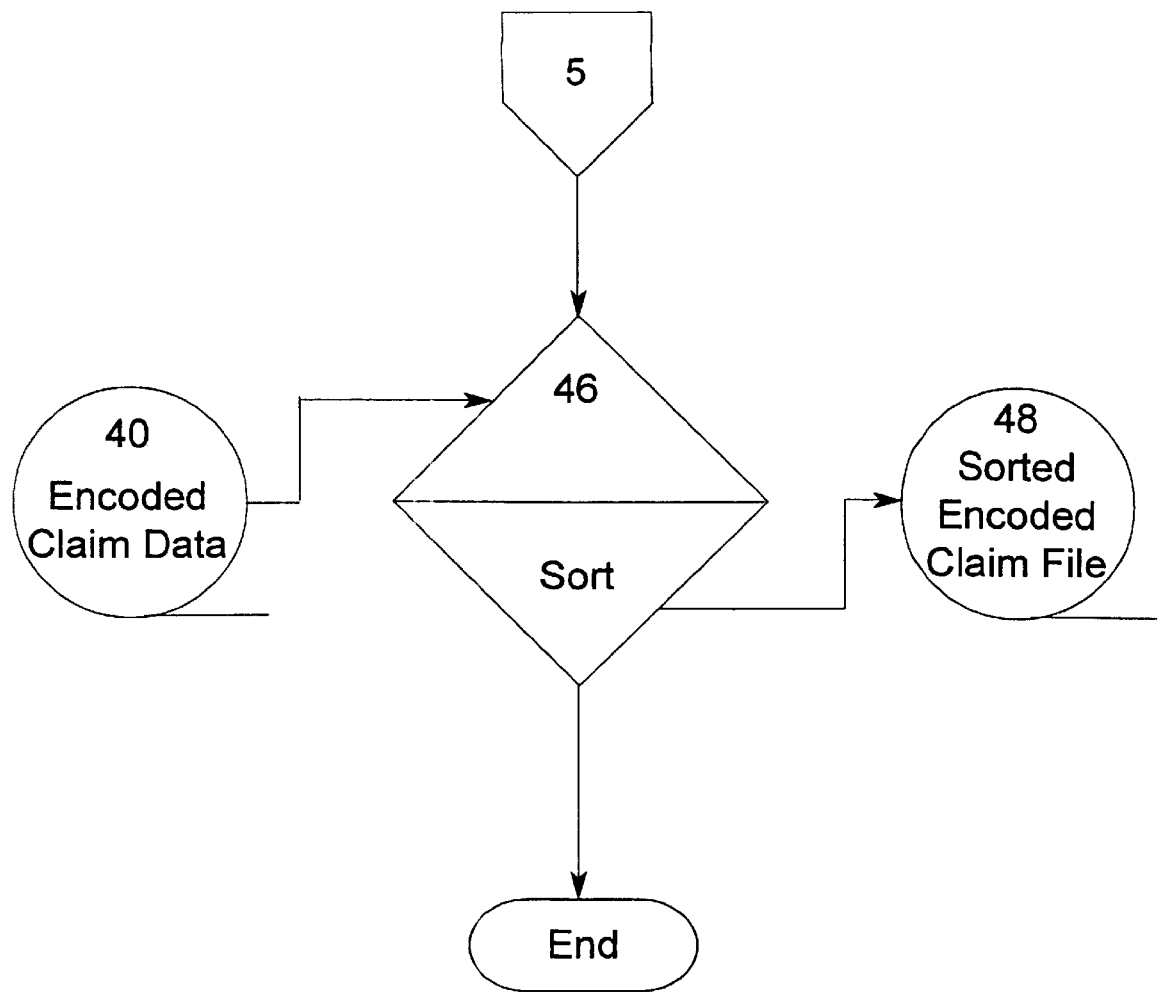
FIG. 5 is a continuation of the flow chart of FIG. 4.

FIGS. 3–5 illustrate the claim data extraction and preprocessing steps which comprise the data collection function of "production" branch 10. Following these steps (with reference to FIG. 1), the process of data analysis begins.

Figure 6:
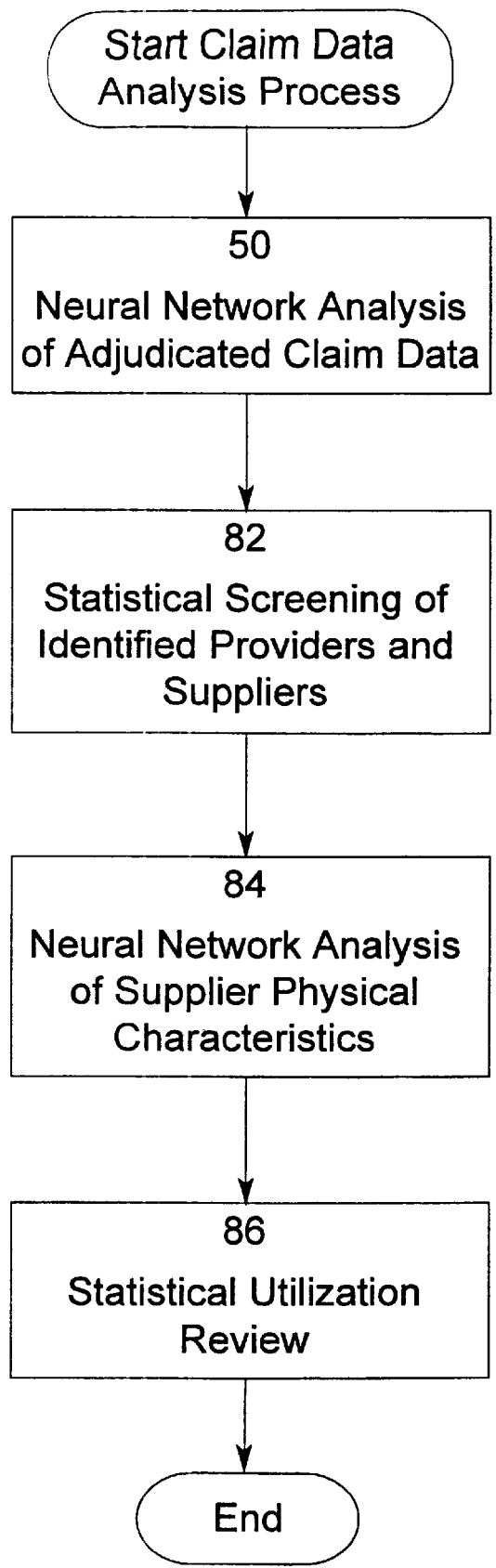
FIG. 6 illustrates a claim data analysis process which is part of the overall operation of the method and apparatus of FIG. 1.
Figure 7:
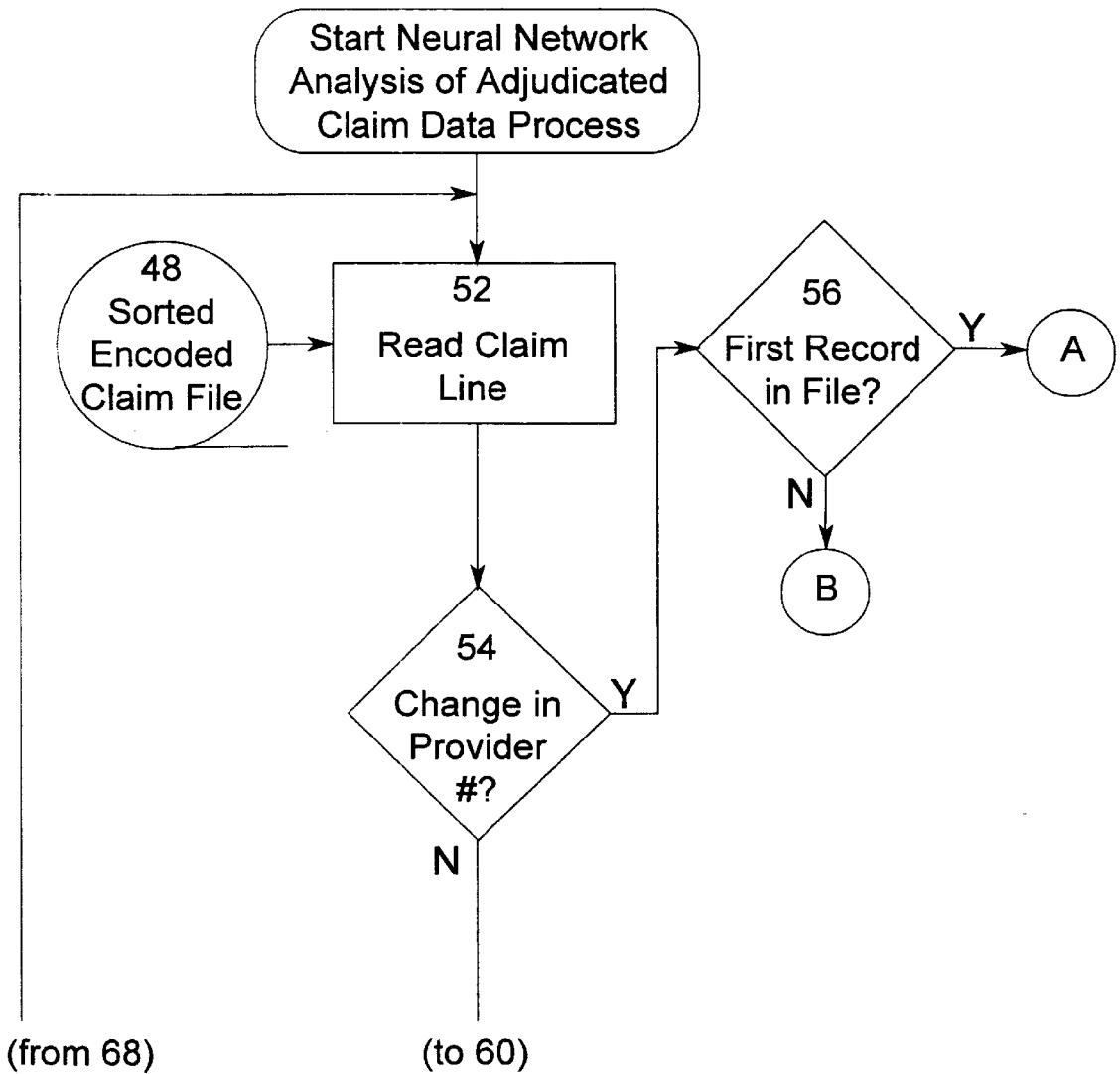
FIG. 7 illustrates a neural network analysis of adjudicated claim data process which is a portion of the claim data analysis process illustrated in FIG. 6.
Figure 7:
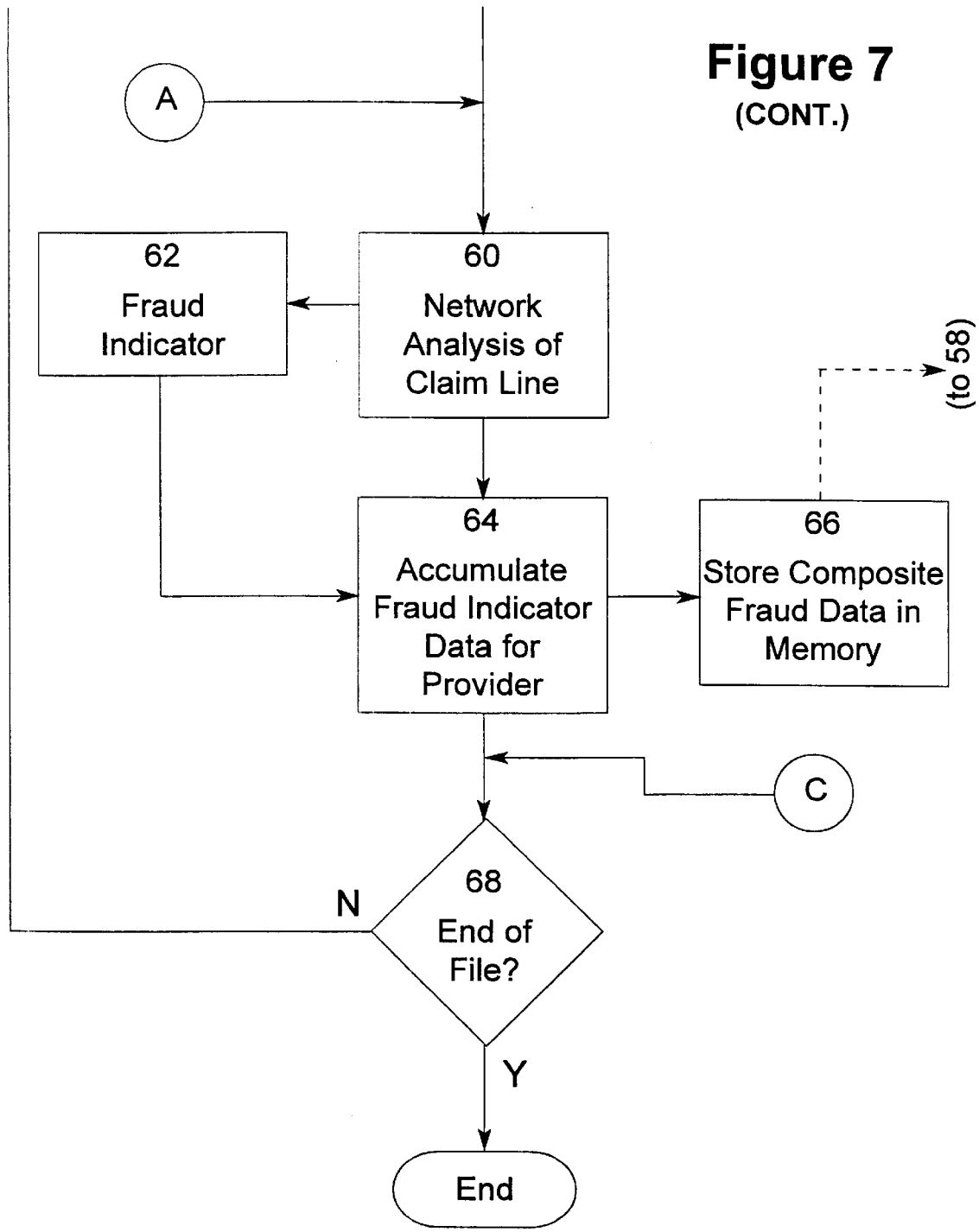
Figure 7:
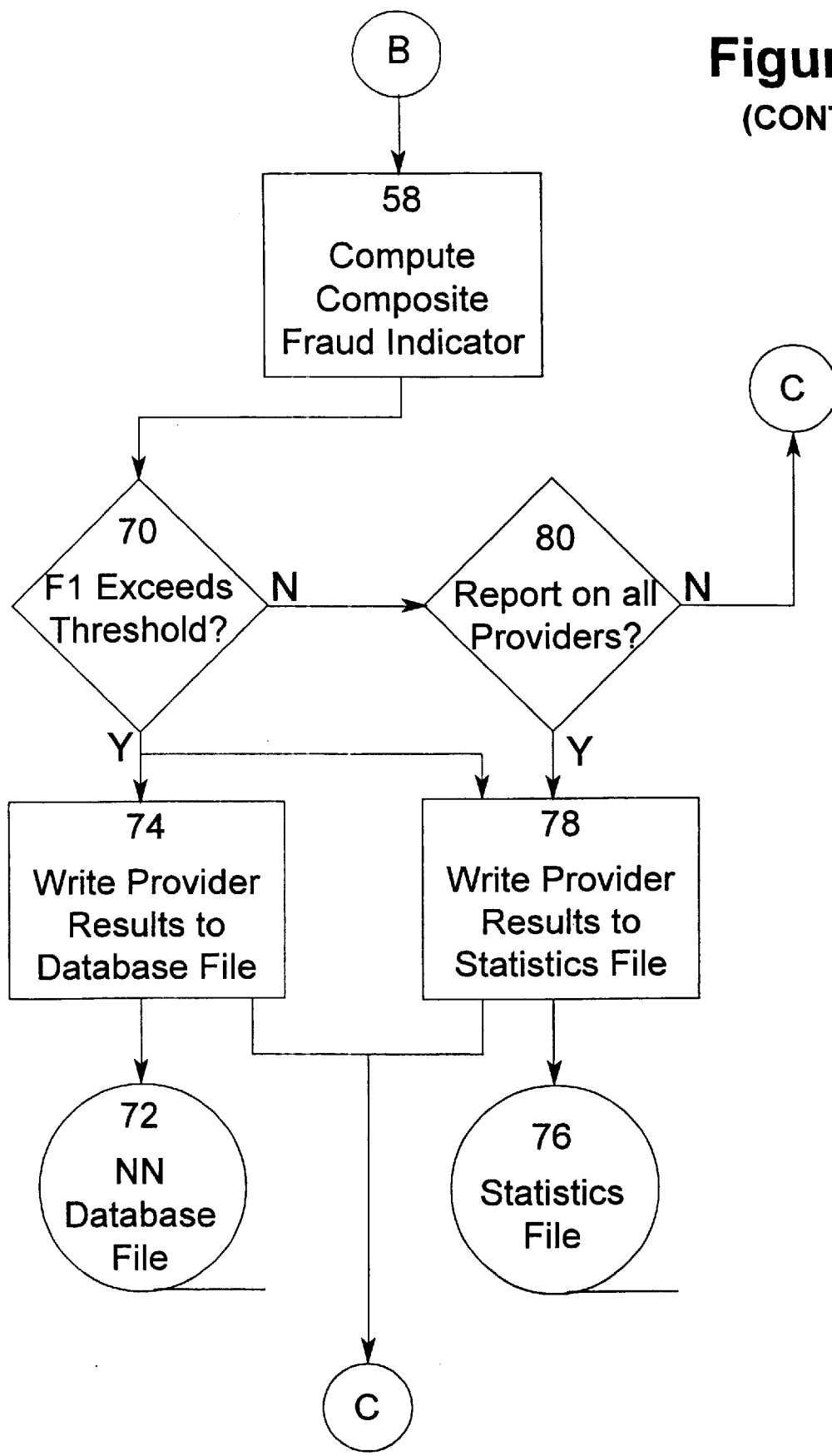

FIG. 6 illustrates the beginning of claim data analysis. Block 50 represents a neural network analysis of adjudicated claim data, which is illustrated in detail in the flow chart of FIG. 7. With reference to FIG. 7, the system first reads claim line data (block 52) from sorted encoded claim file 48 (see FIG. 5). After reading the encoded claim data, the system then determines whether the provider number has changed from the preceding provider (block 54). If so, the system determines whether the subject line is the first record in the file (block 56). If the answer to that question is no, the system branches to B, as indicated. If the answer to that question is yes, or if the provider number did not change, the system proceeds to process block 60. Block 60 represents the process by which a neural network analyzes the claim line information in claim file 48 to produce a number or score for each claim line which is viewed as a fraud index or indicator. This value is stored in memory 62 and is accumulated (block 64) for each supplier or provider. In one embodiment of the invention, the process of accumulating the data involves simply adding the fraud indicators produced for each claim line to produce a total for a particular supplier or provider. Composite fraud data is stored in memory 66 for subsequent use in the computational process of branch B. After storage, the system determines, in block 68, if additional data remains to be processed. If so, the process of reading the next claim line block 52) begins. The process of analyzing each claim line continues until block 54 detects a change in provider number. When the provider number changes, and the system is not examining the first record in claim file 48, the system determines that all lines for the prior provider have been analyzed and proceeds to branch B. In block 58, a computation is performed on the composite fraud data stored in block 66 to compute a composite fraud indicator. In one embodiment of the invention, this computation involves computing an average fraud indicator for the claim lines analyzed for a particular provider. In other words, the fraud indicators stored in memory 62 for each claim line analyzed for a particular provider are summed and divided by the total number of claim lines. This approach represents one of several which may be used. Other approaches include computing a weighted average of the individual fraud indicators, or selecting a subset of the indicators for use in computing the composite fraud indicator. After the composite fraud indicator is computed, it is compared to a threshold number which is based upon prior experience (block 70). The threshold number may be arbitrarily fixed or, alternatively, may be dynamic in the sense of being periodically or continuously updated by the system as additional data is processed. If the composite fraud indicator exceeds the threshold, the results for the subject supplier or provider are written to neural network (NN) data base file 72 in a process represented by block 74. Only information on providers exceeding the threshold is stored in NN data base file 72. Data base file 72 serves as an input to a data base tracking system which provides for continuity across several days (or other period of interest). In the event the fraud indicator exceeds the threshold value, provider results are also written to statistics file 76 in a process represented by block 78. If the composite fraud indicator does not exceed the threshold, the system asks if a report is to be provided on all providers (block 80). If so, the provider results are written to statistics file 76. Statistics file 76 is essentially a report file which can be viewed by the user on line or printed, at the user's discretion. The system then branches as indicated to C and proceeds with neural network analysis of the first claim line for the new provider. This process continues until the end of sorted encoded claim file 48 is detected by block 68.

Referring again to FIG. 6, after the neural network analysis of adjudicated claim data is completed, the system may perform one or more of the operations represented by blocks 82, 84, and 86 of FIG. 6. Block 82 represents a statistical screening of identified providers and suppliers. Block 84 represents a neural network analysis of supplier physical characteristics. Block 86 represents a statistical utilization review. Each of these operations is discussed, respectively, in connection with FIGS. 8, 9, 10, and 11 below. It is preferred, but not required, to perform all three operations in practicing the present invention. However, any one or more of the operations may be omitted. Moreover, when two or more of the operations are performed, the order in which they are performed may be varied.

Figure 8:
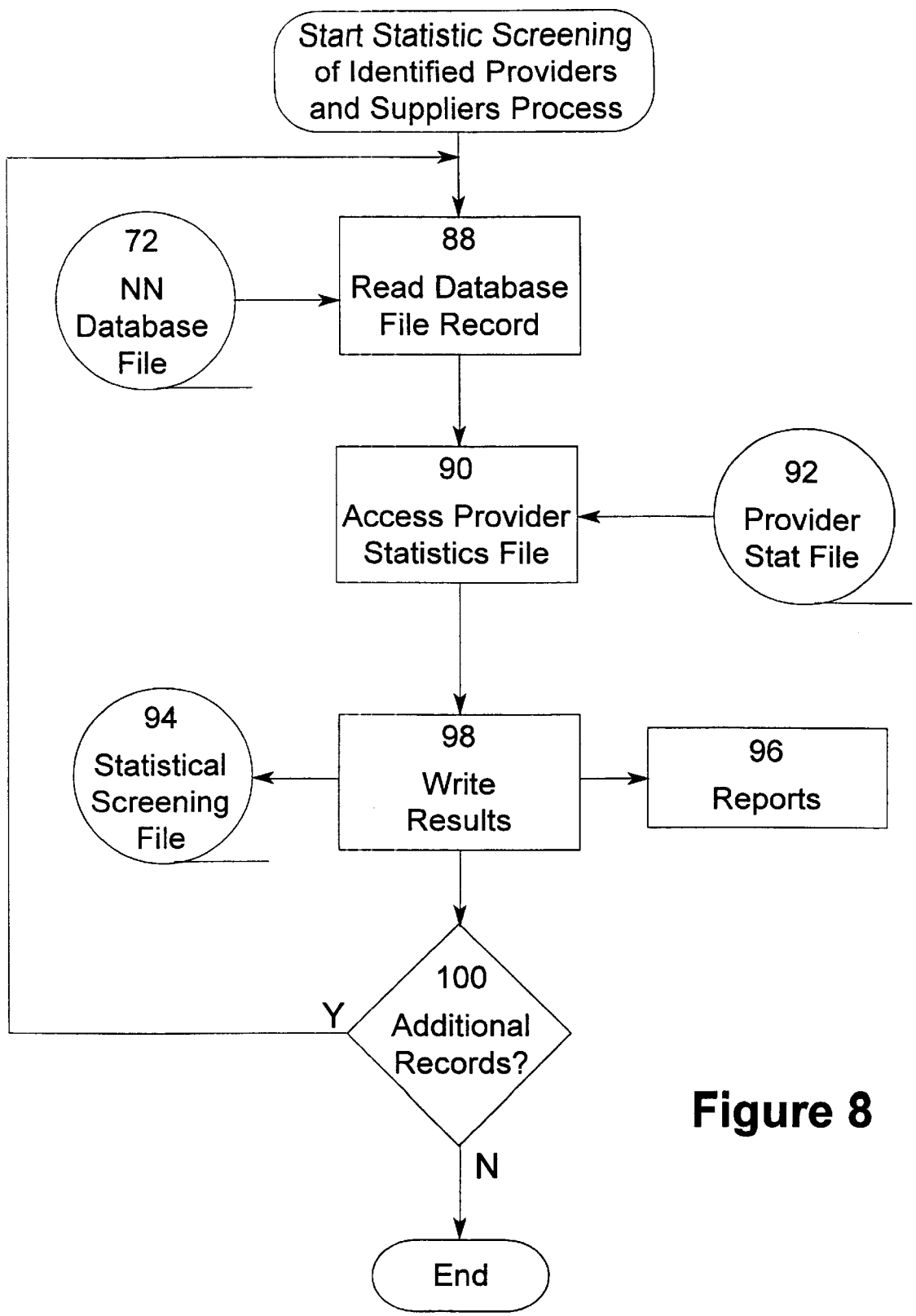
FIG. 8 illustrates a statistical screening of identified providers and suppliers process which is a part of the claim data analysis process of FIG. 6.

FIG. 8 illustrates a flow chart representation of the operation of block 82. The system first reads the database file records in NN database file 72 which was compiled in the operation illustrated by the flow chart of FIG. 7. NN database file 72 includes provider results for only those providers that were found to exceed the fraud indicator threshold value. This read operation is represented by block 88 in FIG. 8. Next, the system accesses provider statistics in an operation represented by block 90. Statistical information is accessed from provider stat file 92 which is compiled in a statistical system update operation illustrated in FIGS. 13 and 14 discussed below. The statistical information on provider stat file 92 is produced from periodic analyses of fraud indicative statistics for each provider. The fact that a particular provider has now been identified by virtue of their inclusion in NN database file 72 as a potential fraudulent provider will now cause the system to examine the statistical information for that provider previously analyzed and stored in provider stat file 92. After accessing this information, the system writes results to statistical screening file 94 and, optionally, to report 96 in an operation which is represented by block 98. This operation is performed for each of the suspect providers identified in NN database file 72. The system determines whether additional records remain to be analyzed (block 100), and continues until all suspect providers identified in NN database file 72 are processed.

Figure 9:
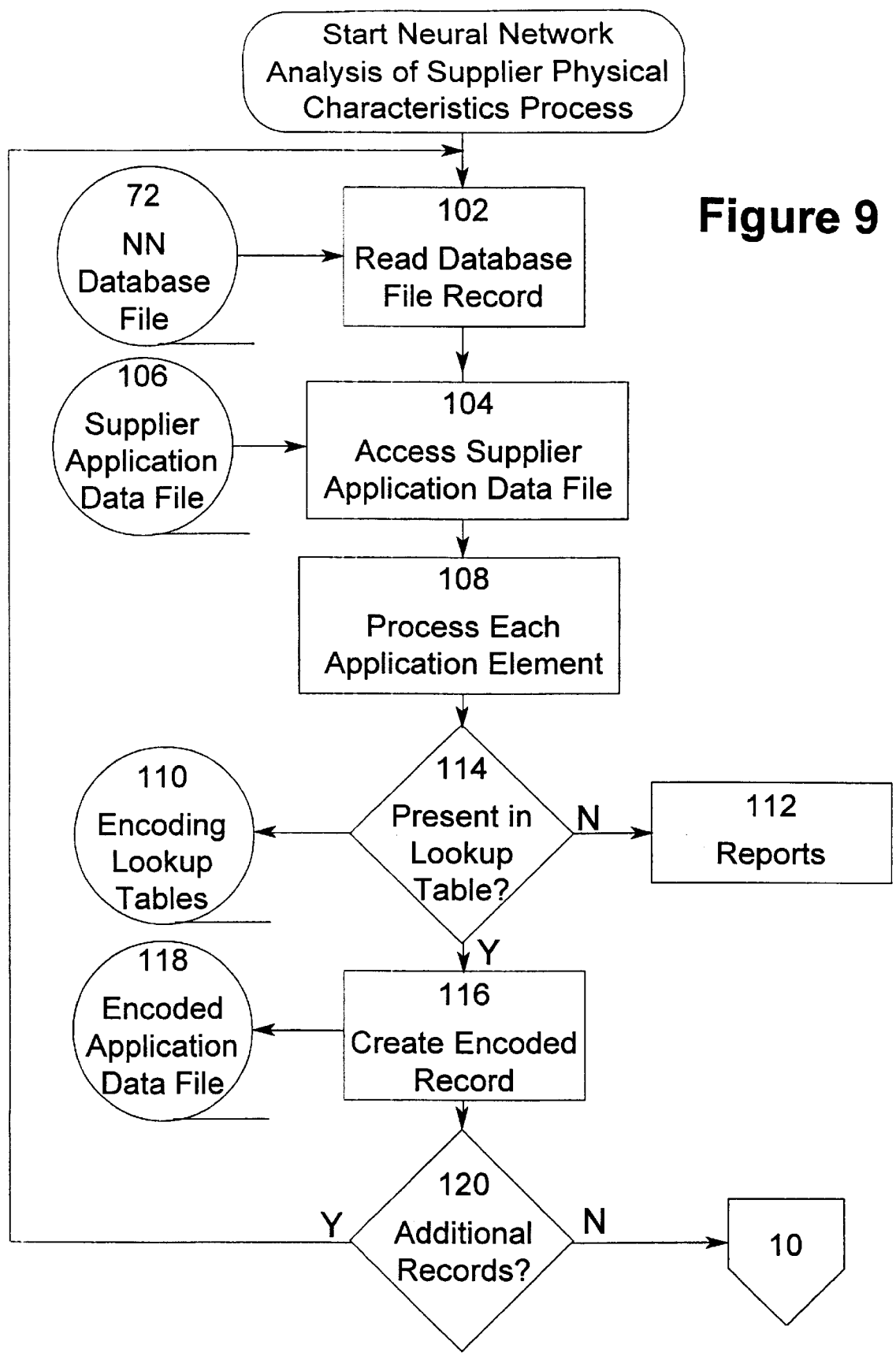
FIG. 9 shows a flow chart which illustrates a neural network analysis of supplier physical characteristics process which is a part of the claim data analysis process of FIG. 6.
Figure 10:
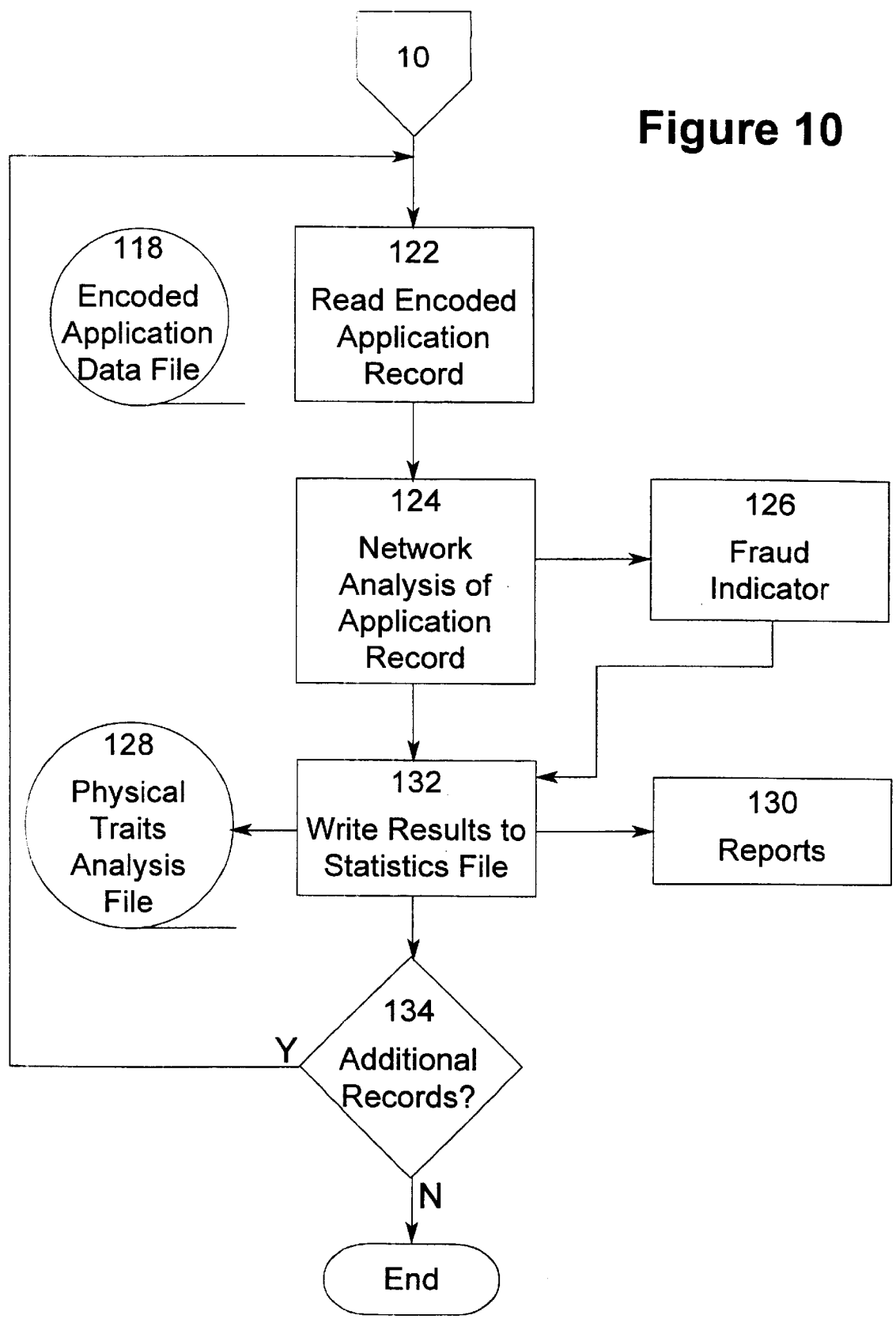
FIG. 10 is a continuation of the flow chart of FIG. 9.

FIGS. 9 and 10 illustrate in additional detail the process of block 84. With reference to FIG. 9, this portion of the system first reads the database file record (block 102) from NN database file 72. Following this step, the system then accesses supplier application data (block 104) from supplier application data file 106. The system then processes each element of application data (block 108) by encoding each element of data present in encoding lookup tables 110. An optional report 112 may be generated to identify those elements of application data which are not present in the lookup tables. After determining (block 114) that an element is present in lookup tables 110, the system creates an encoded record (block 116) and stores the encoded information in encoded application data file 118. The system then determines if additional records remain to be processed (block 120). When all the records have been processed, the system branches as indicated to the flow chart of FIG. 10.

With reference to FIG. 10, the system first reads the encoded application records (block 122) from encoded application data file 118. The system then performs a neural network analysis using the encoded application data (block 124) to generate a fraud indicator (block 126). It should be noted that in this portion of the system, only one record per supplier is present in encoded application data file 118. Therefore, a composite fraud indicator is not produced. The results of the neural network analysis (i.e., the fraud indicator) are written to physical traits analysis file 128 and, optionally, a separate report 130 by an operation which is represented by block 132. The information stored in physical traits analysis file 128 may be used in subsequent processing, as is described in connection with FIG. 12 below. The system then determines whether all records in encoded application data file 118 have been read and analyzed (block 134).

Figure 11:
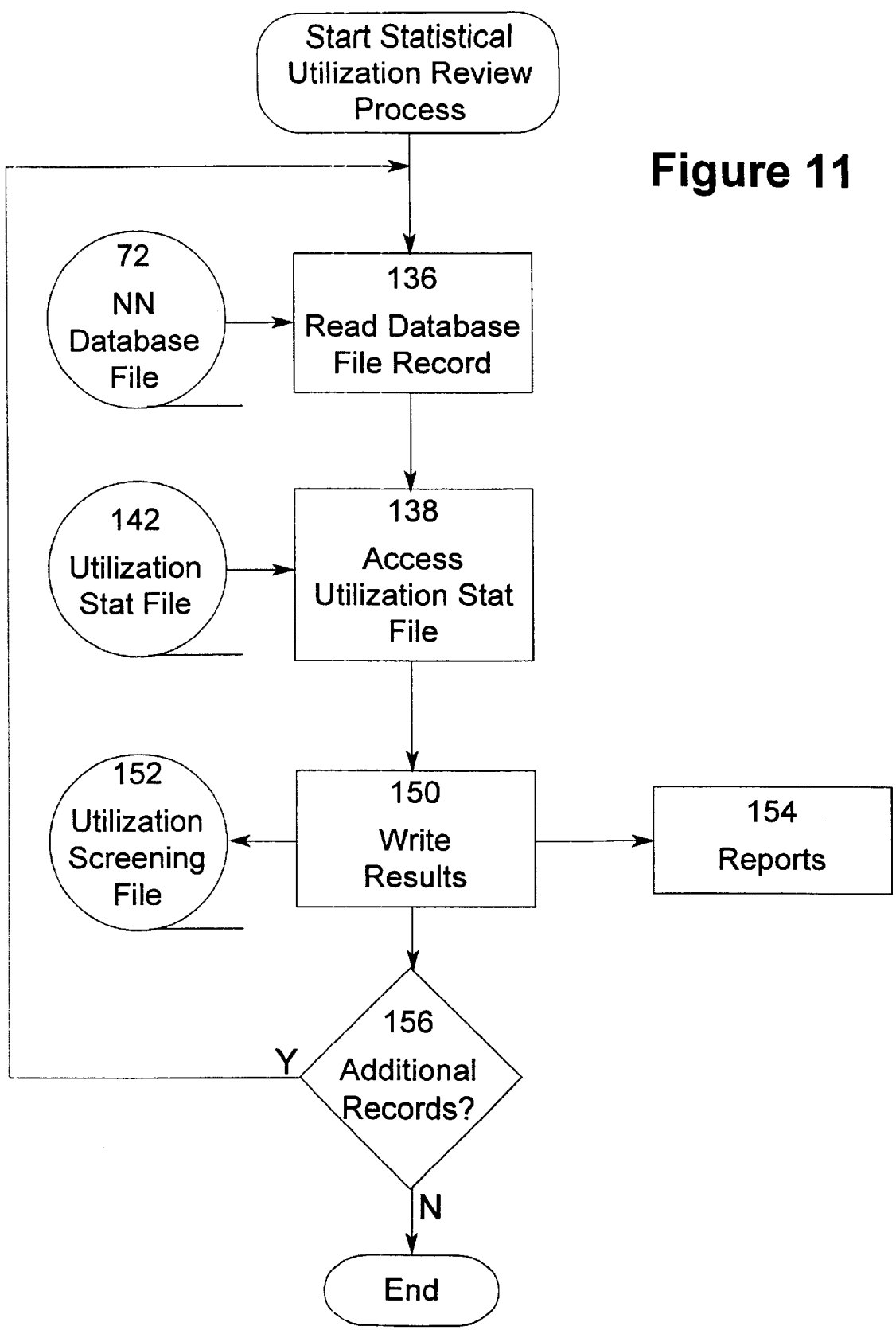
FIG. 11 is a flow chart which illustrates a statistical utilization review process which is a part of the claim data analysis process of FIG. 6.

FIG. 11 illustrates in flow chart form the operation of block 86 of FIG. 6. As was the case in the operations of blocks 82 and 84, the process of FIG. 11 begins by reading the data base file record from NN database file 72 in an operation represented by block 136. Recall that NN database file 72 contains information on those providers having a composite fraud indicator which exceeds the threshold set by the system in FIG. 7. Next, the system accesses utilization statistics in an operation represented by block 138. Utilization statistical information is accessed from utilization stat file 142 which is compiled in a statistical system update operation described in FIGS. 13 and 14 discussed below. The statistical information on utilization stat file 142 is produced from periodic analyses of utilization parameters for each provider. The fact that a particular provider has now been identified by virtue of their inclusion in NN database file 72 as a potential fraudulent provider will now cause the system to examine the statistical utilization information for that provider previously analyzed and stored in utilization stat file 142. After accessing this information, the system writes results to utilization screening file 152 and, optionally, to report 154 in an operation which is represented by block 150. This operation is performed for each of the suspect providers identified in NN database file 72. The system determines whether additional records remain to be analyzed (block 156), and continues until all suspect providers identified in NN database file 72 are processed. As is the case with statistical screening file 94 and physical traits analysis file 128, utilization screening file 152 is optionally used by the system in identifying a fraudulent provider, as explained in additional detail in connection with FIG. 12.

The foregoing discussion illustrates a preferred embodiment of the processes of data collection and data analysis referred to in blocks 2 and 4 of FIG. 1. After these processes have been completed, the system proceeds with the system determination step illustrated by block 6 of FIG. 1. The process of block 6 is illustrated in detail by the flow chart of FIG. 12.

Figure 12:
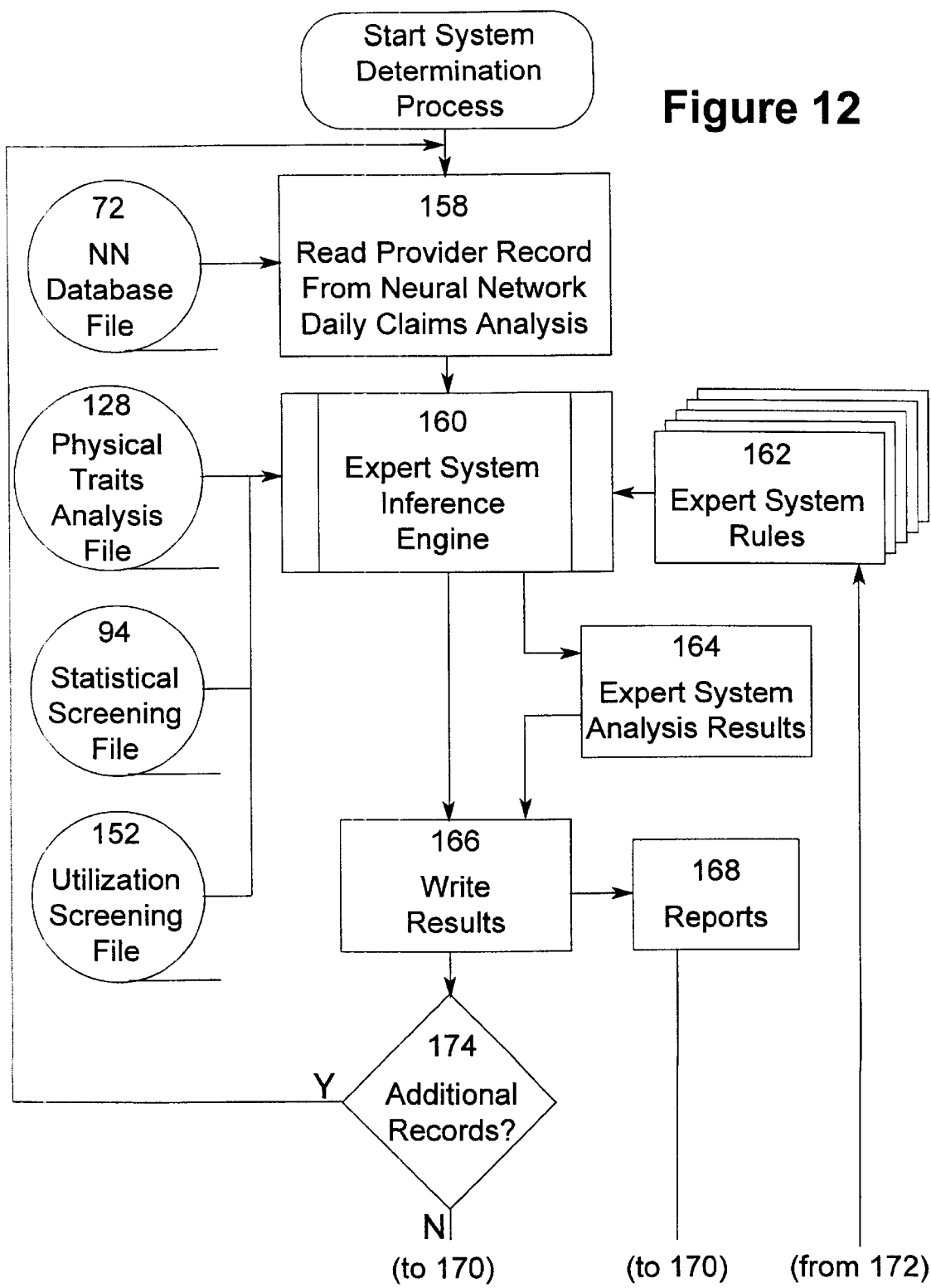
FIG. 12 is a flow chart which illustrates a system determination process which is part of the overall operation of the method and apparatus of the present invention illustrated in FIG. 1.
Figure 12:
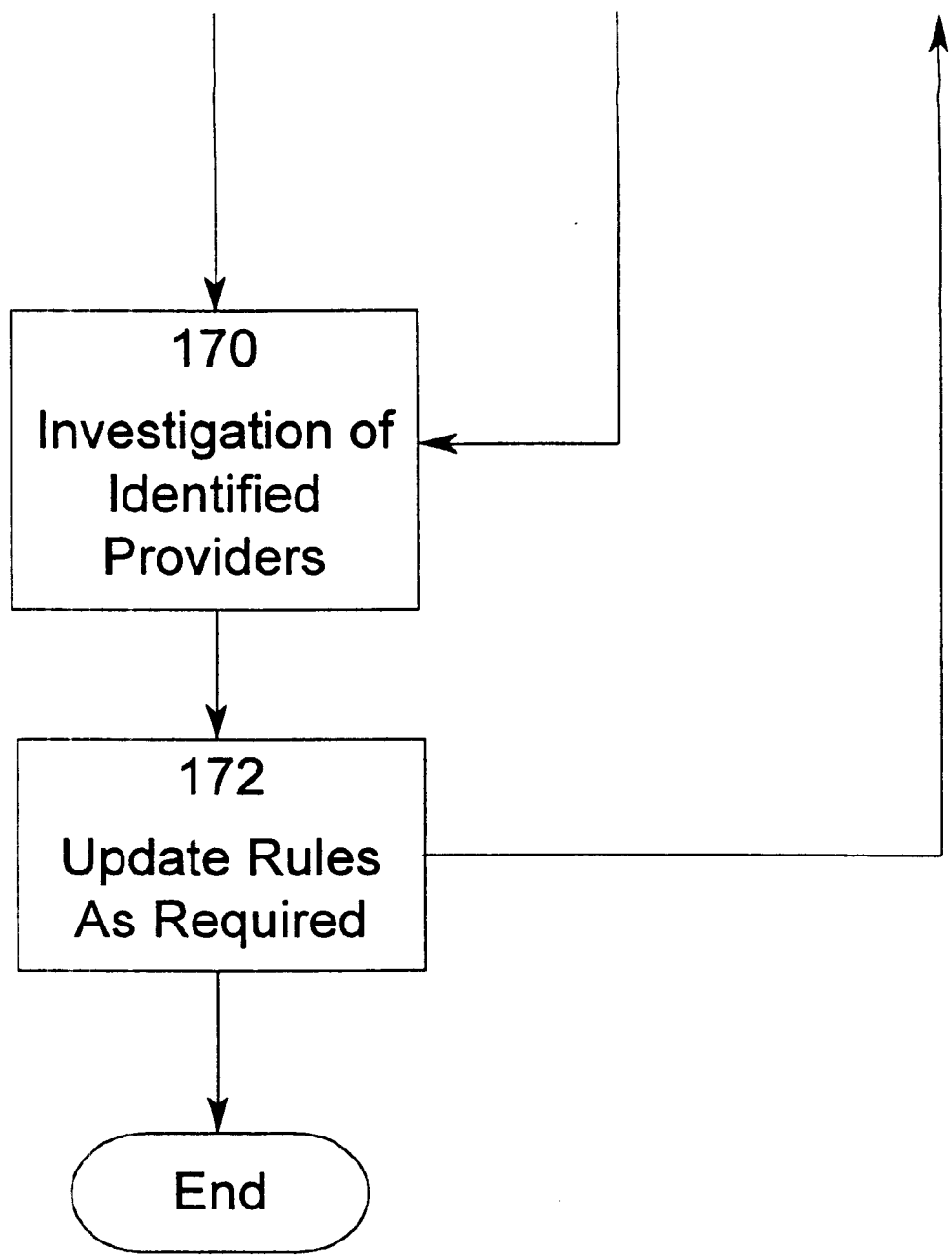

With reference to FIG. 12, the initial step in the system determination process involves reading provider records (block 158) from NN database file 72. Each record is then analyzed by an expert system inference engine (block 160) in accordance with a plurality of expert system rules 162. An illustrative example of a situation addressed by expert system rules 162 is the provider who is "new" to the Medicare program (i.e., has just recently begun billing Medicare for services), and who submits claims for numerous and expensive services. In this case, the expert system may identify the provider as potentially fraudulent.

Data from physical traits analysis file 128, statistical screening file 94, and utilization screening file 152 is optionally and preferably provided for use in the expert system analysis. Results of the expert system analysis are accumulated (block 164) and/or written (block 166) to a report 168 which may be in hard copy or other media. The report may then be used to initiate further investigation of suspect providers (block 170). The results of further investigation may then be used to update rules 162, as deemed necessary and appropriate, in an operation which is represented by block 172. It should be noted that rules 162 may be crafted to make the system more or less stringent in identifying suspect suppliers as the particular application merits. With continued use the system will evolve, through updating and training of the neural network and refinement of the expert system rules, into a sophisticated system capable of distinguishing between innocent variations in claim submission patterns of reliable providers and potentially fraudulent submissions.

After each record is analyzed, the system continues to process information from NN database file 72 until all records have been analyzed (block 174).

System Training and Update

With reference to FIG. 2, and specifically to the path generally indicated by reference numeral 12, the illustrated embodiment of the present invention allows for periodic training and updating (block 176). When it has been determined that system training and updating is to take place, a determination is made (block 178) as to what type of training and/or updating is to occur. In the particular embodiment illustrated in FIG. 2, updating of provider stat file 92 may occur for use in statistical screening of selected providers (block 180) and/or statistical utilization screening (block 182). The updating process for provider stat file 92 is illustrated in additional detail in FIGS. 13 and 14.

Figure 13:
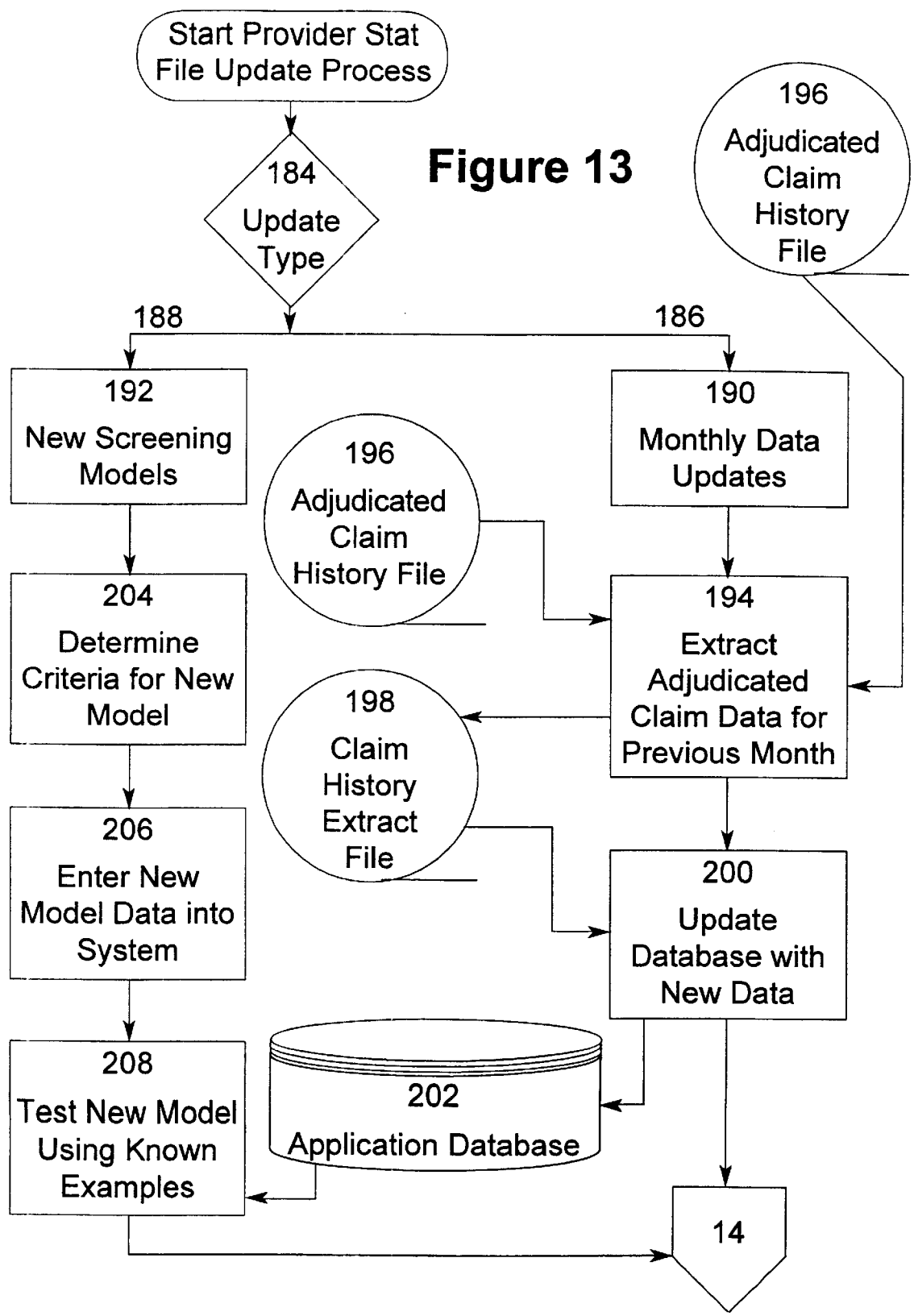
FIG. 13 is a flow chart which illustrates a providers statistical file update process which is part of the system training and update process illustrated in FIG. 2.

With reference to FIG. 13, the updating procedure first determines (block 184) whether a periodic (e.g., monthly) update is being performed (path 186) or whether a new screening model is being incorporated into the system (path 188). The former is represented by block 190, while the latter is represented by block 192. With reference to the periodic data updates, the system first extracts adjudicated claim data for the previous month (block 194) from adjudicated claim history file 196. The extracted data is compiled as claim history extract file 198. This extracted data is used to update (block 200) the application database which is represented in FIG. 13 by database 202.

If it is determined that a new screening model is to be incorporated into the system (path 188/block 192), the system first determines the criteria for the new model (block 204). New model data is then entered into the system (block 206). The new model is then tested (block 208) using known samples from database 202. The remaining steps in the updating procedures for both of paths 186 and 188 then converge and are discussed and illustrated in detail in connection with FIG. 14.

Figure 14:
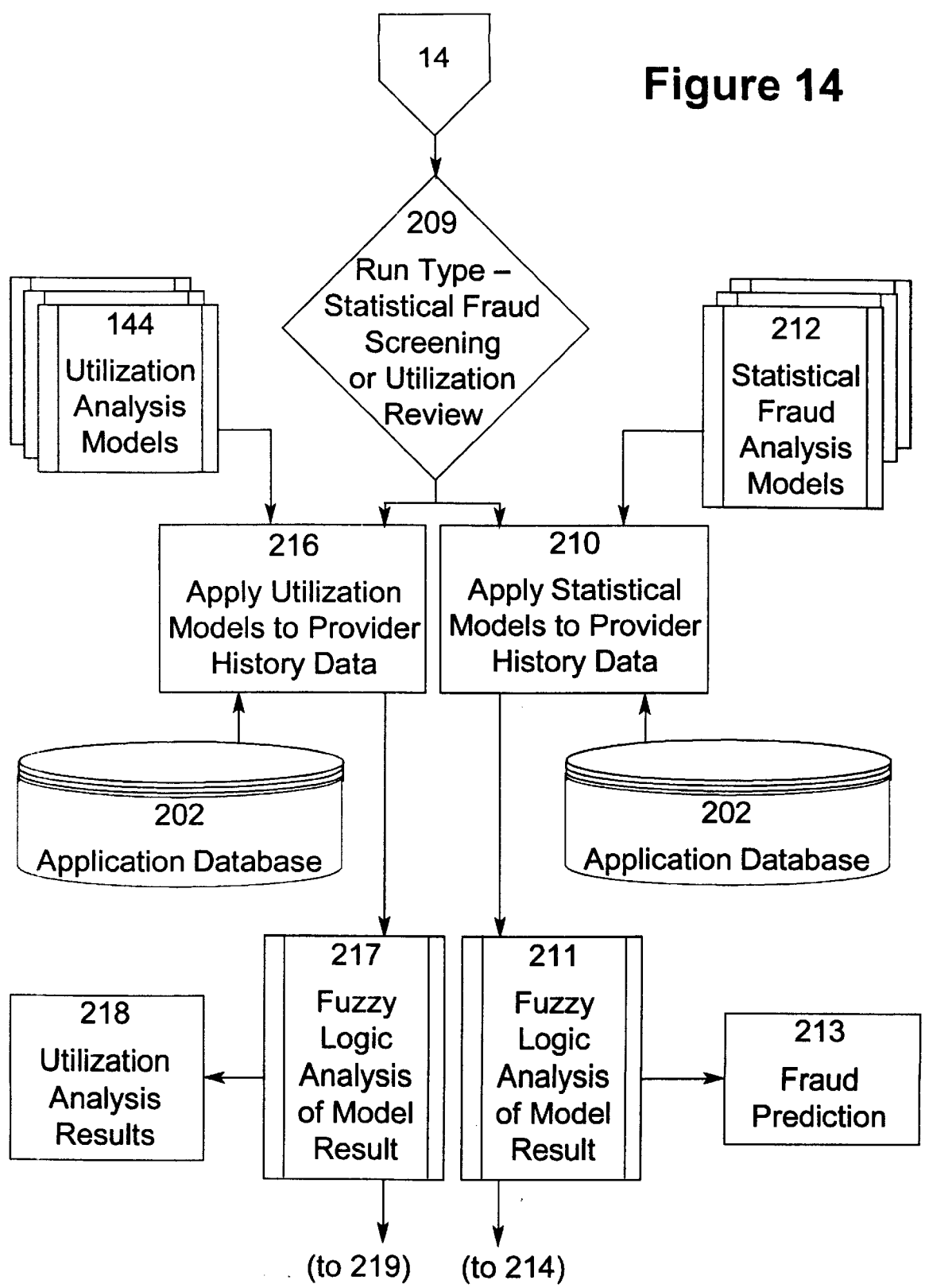
FIG. 14 is a continuation of FIG. 13.

With reference to FIG. 14, the system first determines the statistical run type—i.e., whether the system is being asked to update provider stat file 92 or utilization stat file 142. This determination is represented by block 209. With reference to the right hand side of FIG. 14, the process of updating provider stat file 92 begins with an application of statistical fraud analysis models 212 to provider history data from application data base 202 in an operation represented by block 210. These fraud analysis models examine historical provider characteristics which are highly indicative of suspect behavior. Examples include financial relationships, billing frequency and media type (paper versus electronic) and location. It should be noted that, except for the addition of new screening models as described above, or the possible deletion of outdated models, these models do not change as the system is used. However, the various providers undergoing analysis by the models do typically change. Following application of these statistical screening models, a fuzzy logic analysis of model results (block 211) is performed to optionally produce a fraud prediction (block 213) and to update (block 214) provider stat file 92 with the results of the analysis for each provider. An optional report 215 may also be produced at this time.

A similar procedure is outlined on the left side of FIG. 14 for updating utilization stat file 152. The portion of the system described on this side of FIG. 14 is intended, generally, to analyze the number of services a provider is delivering to a server population, and determine whether the number of services provided is greater than average, less than average, or average. The system may also identify whether valid reasons exist for any departure from an expected result. This analysis is made in block 216, using information available from application database 202 and statistical utilization analysis models 144. Utilization analysis models generally examine the relationships between services rendered, the diagnosis or problem(s) which the services were intended to treat, and the provider's specialty or area of expertise. These models are applied over a period of time in an attempt to identify outliers or other statistically significant deviations.

The process of analysis includes applying statistical utilization review models 144 to the provider's historical data (block 216). A fuzzy logic analysis of the model data may also be performed (block, 217) with the results written to utilization stat file 142 and an optional report 221.

The other major function along path 12 of FIG. 2 is training of the neural network (block 220). The training process of the present invention is illustrated by the flow charts of FIGS. 15–22.

Figure 15:
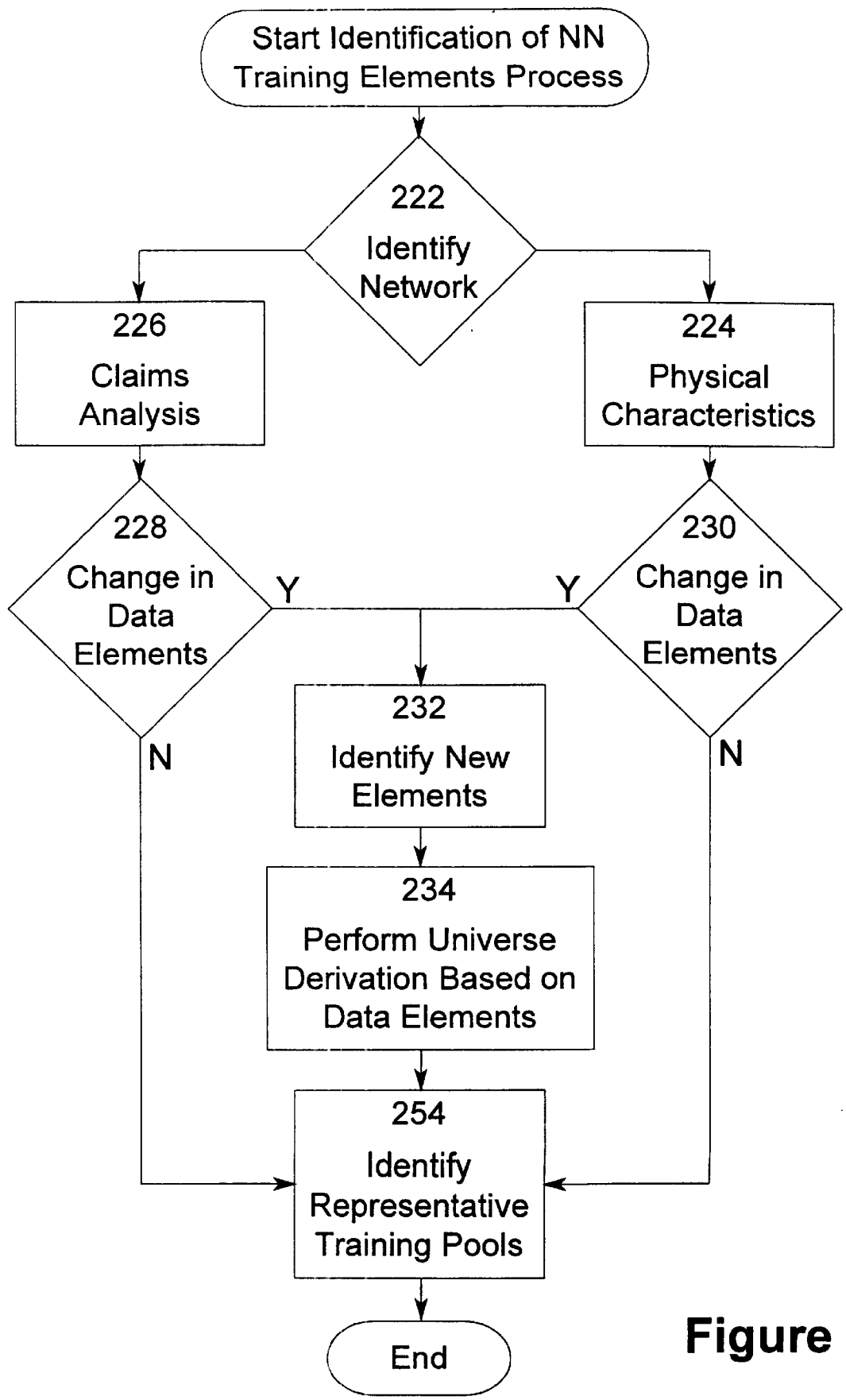
FIG. 15 is a flow chart which illustrates the process of identifying neural network training elements which is a part of the system training and updating process of FIG. 2.

With reference to FIG. 15, the training routine first determines (block 222) which neural network is being trained. In the present embodiment, options are the neural network referred to in connection with block 124 of FIG. 10 relating to physical characteristics of providers (represented in FIG. 15 by block 224) and the network analysis used to produce NN database file 72 of FIG. 7 (represented in FIG. 15 by block 226). Regardless of which network is being updated, the system first determines whether there has been a change in data elements of the system (blocks 228 and 230). A change could result if the system has seen a value for an element outside the known universe of element values. If so, the system identifies the new elements (block 232) and determines what the entire universe of possibilities can be for that particular element or elements (block 234).

Figure 16:
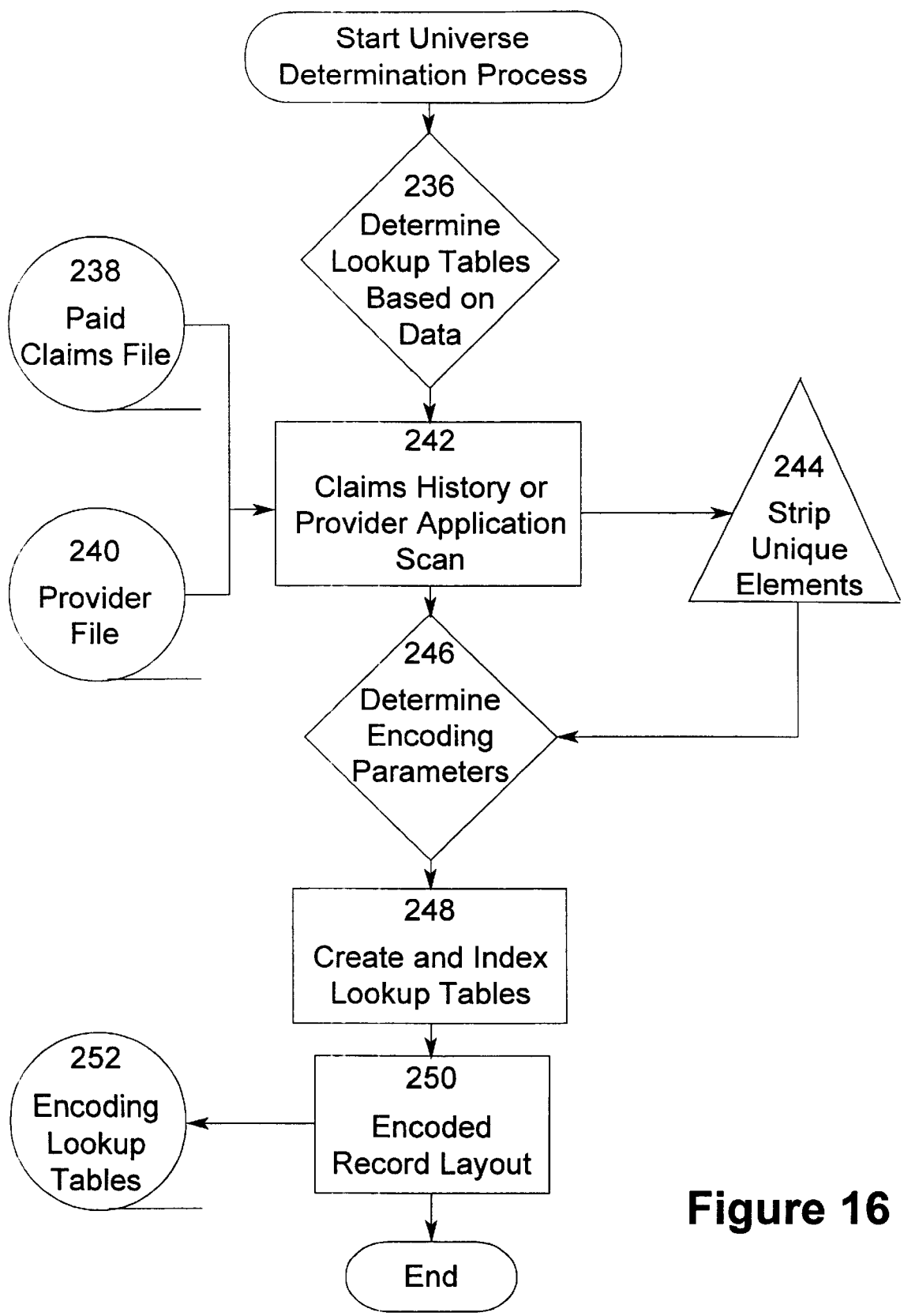
FIG. 16 illustrates a universe determination process which is a part of the training element identification process of FIG. 15.

The process of universe determination generally illustrated by block 234 is described in additional detail in connection with FIG. 16. With reference to FIG. 16, this portion of the system first determines the number of lookup tables needed based upon the data elements present (block 236). For example, lookup tables for months, days, hours, or minutes may be needed, depending upon the data elements present. Next, the system examines paid claims data file 238 and provider database file 240 looking for all possible values for the particular element involved (block 242). A sort/merge operation is performed (block 244) to eliminate duplicative information. The next step, represented by block 246, involves determining the encoding parameters to be used for the subject elements. For example, a one event encoding scheme may be used wherein, for instance, seven positions or states would be used to represent the days of the week. The actual determination as to which encoding scheme is to be used may be performed in a manual step. However, once a decision as to the type of encoding scheme is made, the system creates and indexes lookup tables which are based on the selected scheme (block 248). Following creation of the lookup tables, an encoded record layout is prepared (block 250) and the encoding lookup tables 252 are stored for use by the system in, for instance, the process illustrated in FIG. 4.

Following this process (assuming that new elements were identified), the system identifies representative training pools (block 254 in FIG. 15). This process is illustrated in detail in the flow chart of FIG. 17.

Figure 17:
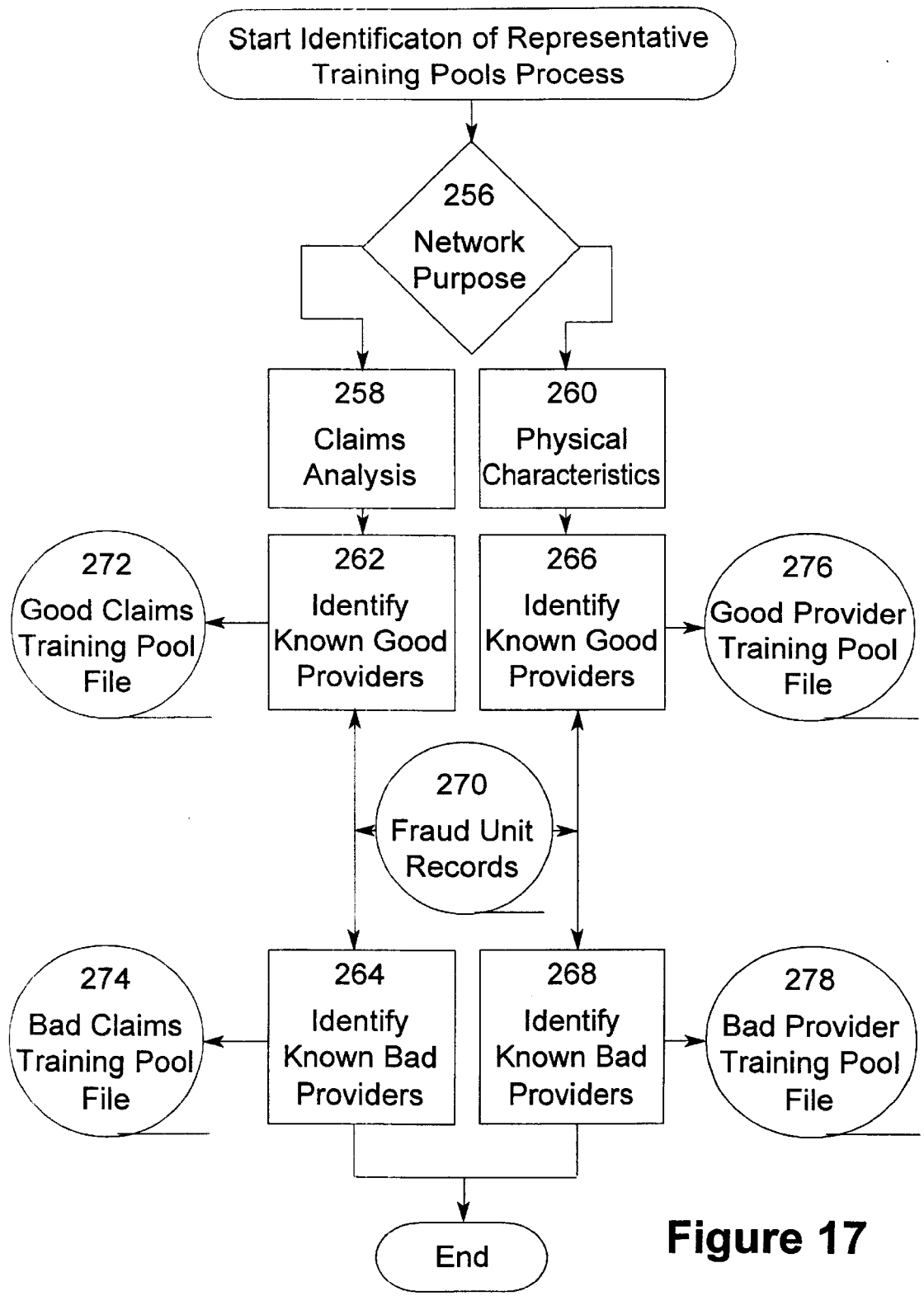
FIG. 17 illustrates a process of identifying representative training pools which is a part of the training elements identification process of FIG. 15.

FIG. 17 illustrates the process of training pool identification. The process begins by first determining which of the neural networks in the system are of interest (block 256). The alternatives in the preferred embodiment of the invention are represented by blocks 258 and 260. Block 258 represents the claims analysis network, while block 260 represents the provider physical characteristics. The process of constructing network training pools is similar in both cases. This process involves identifying known good or bad suppliers or providers (blocks 262, 264, 266 and 268) from the records maintained for known fraudulent suppliers or providers (block 270), and compiling that information to develop the good and bad training pool files identified in FIG. 17 by reference numerals 272, 274, 276 and 278. These training pools are used as discussed below in connection with the flow chart of FIG. 19.

Figure 18:
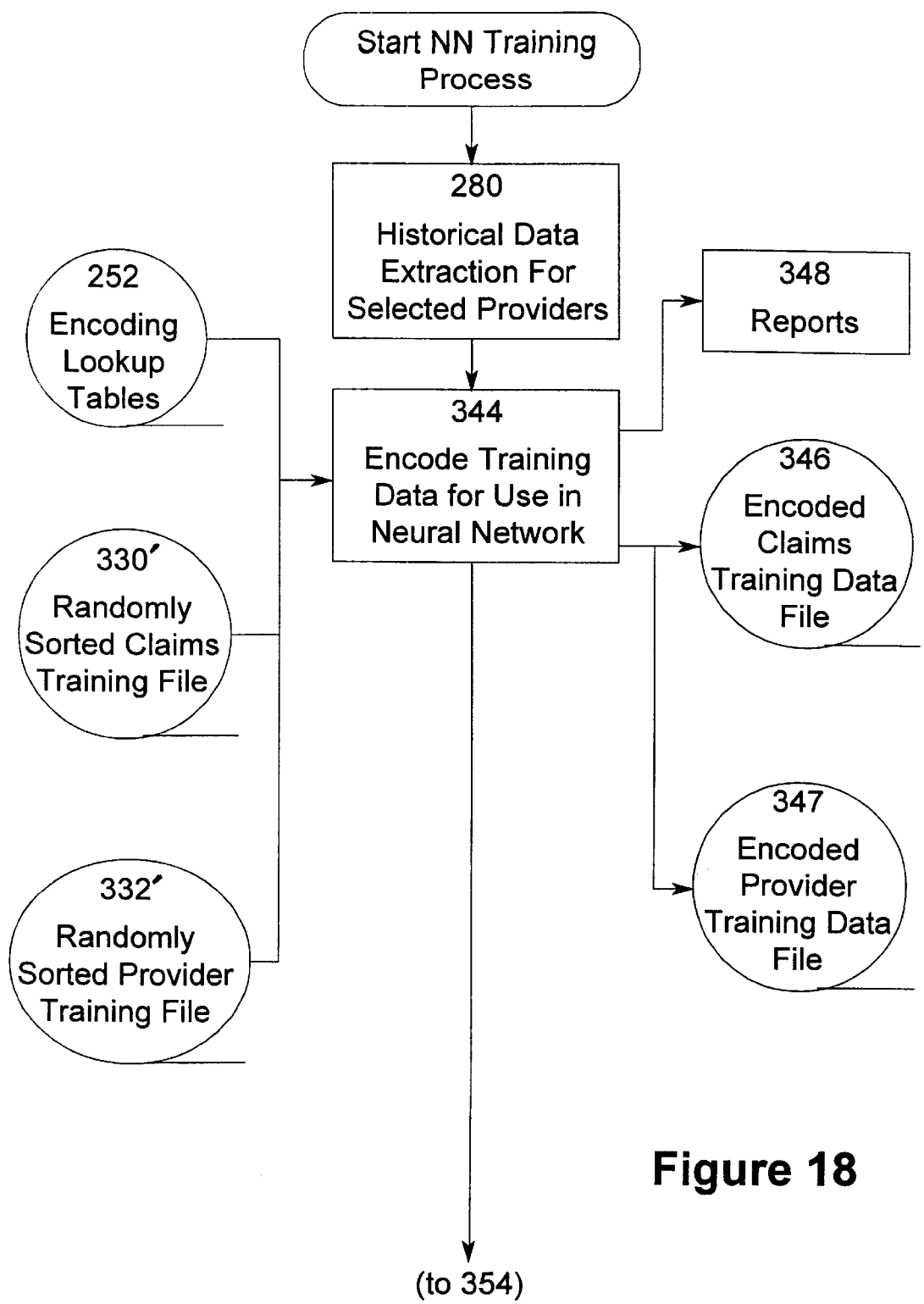
FIG. 18 is a flow chart which further illustrates the neural network training process of FIG. 2.
Figure 18:
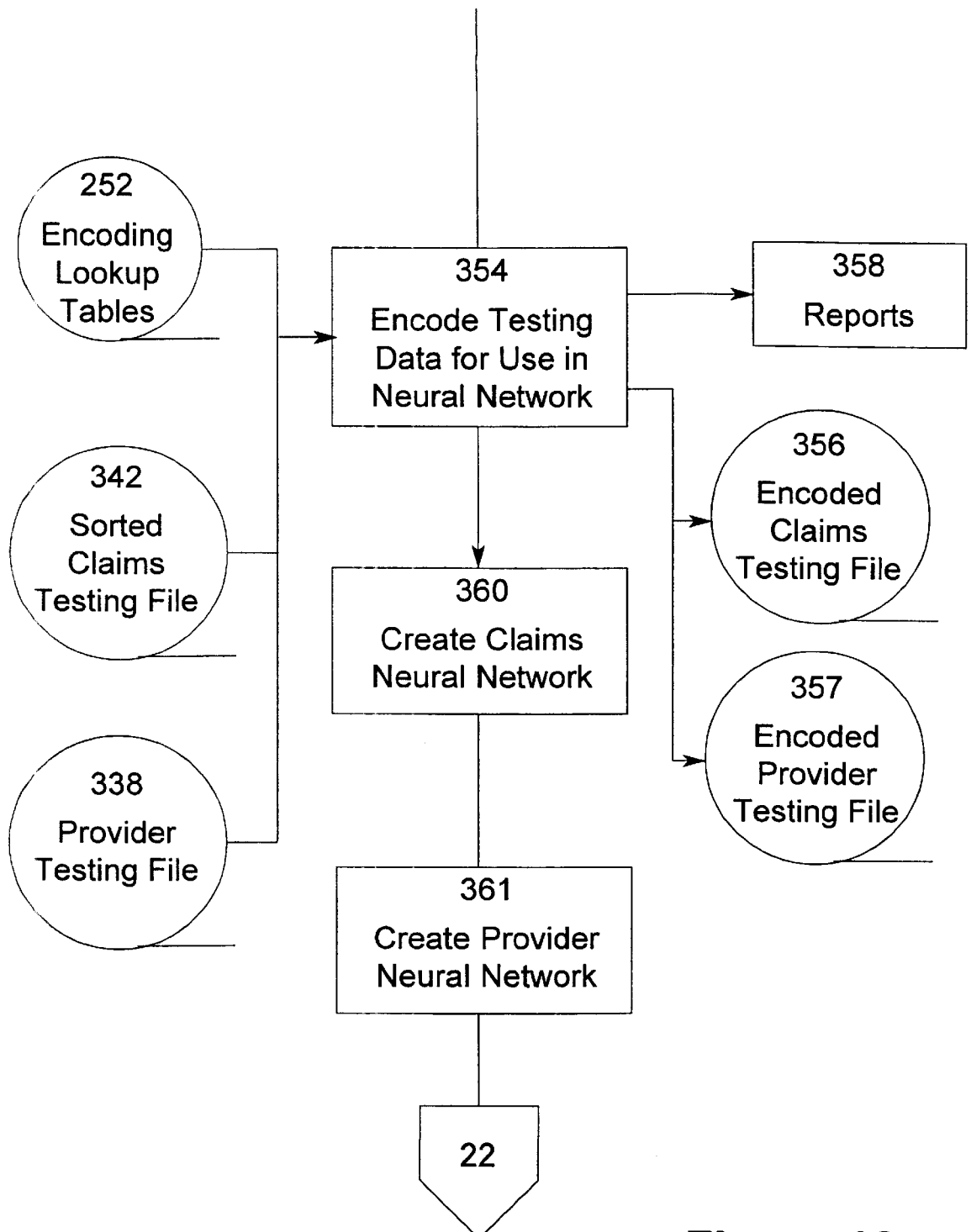
Figure 19:
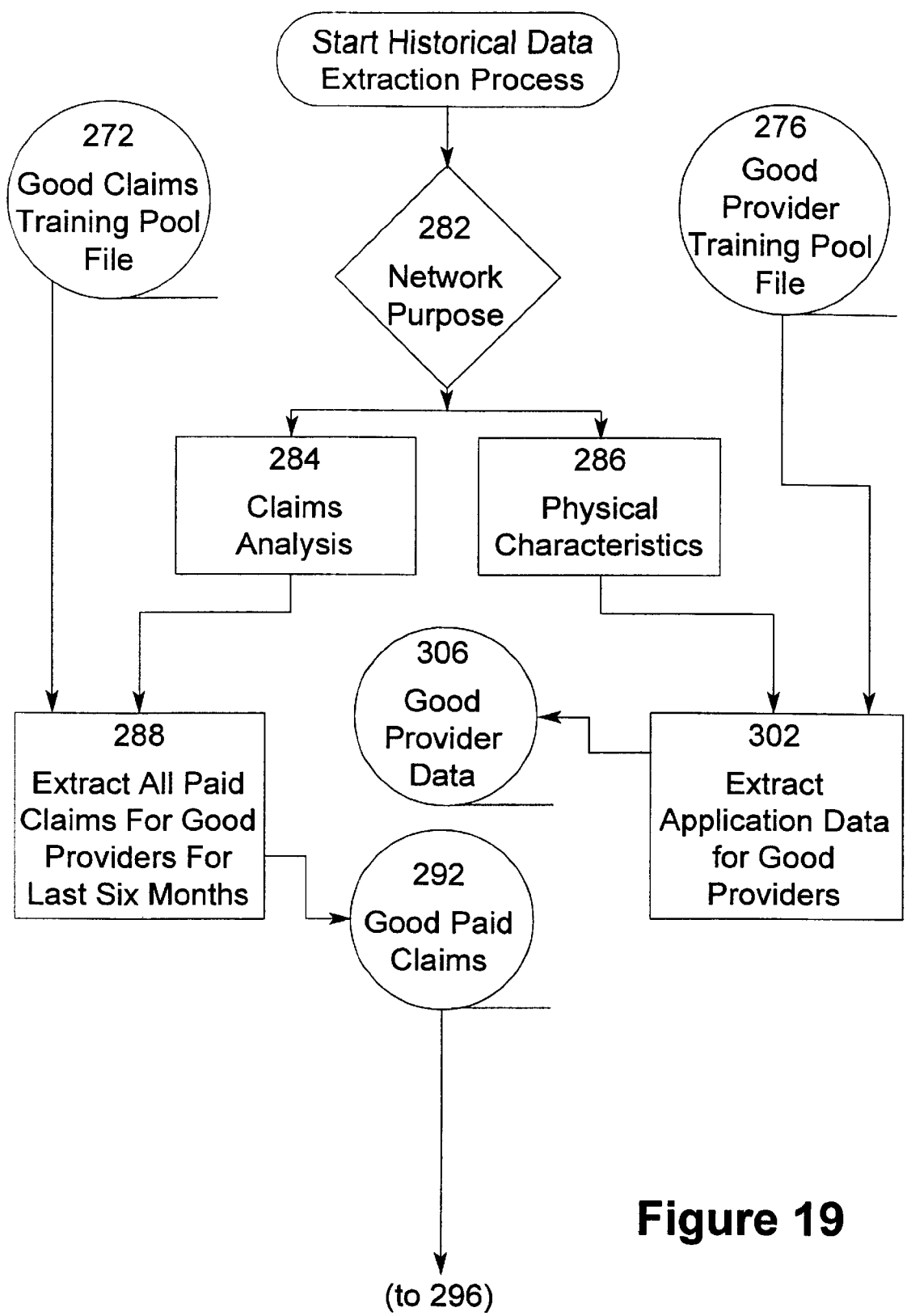
FIG. 19 is a flow chart which illustrates an historical data extraction process which is a part of the neural network training process of FIG. 18.
Figure 19:
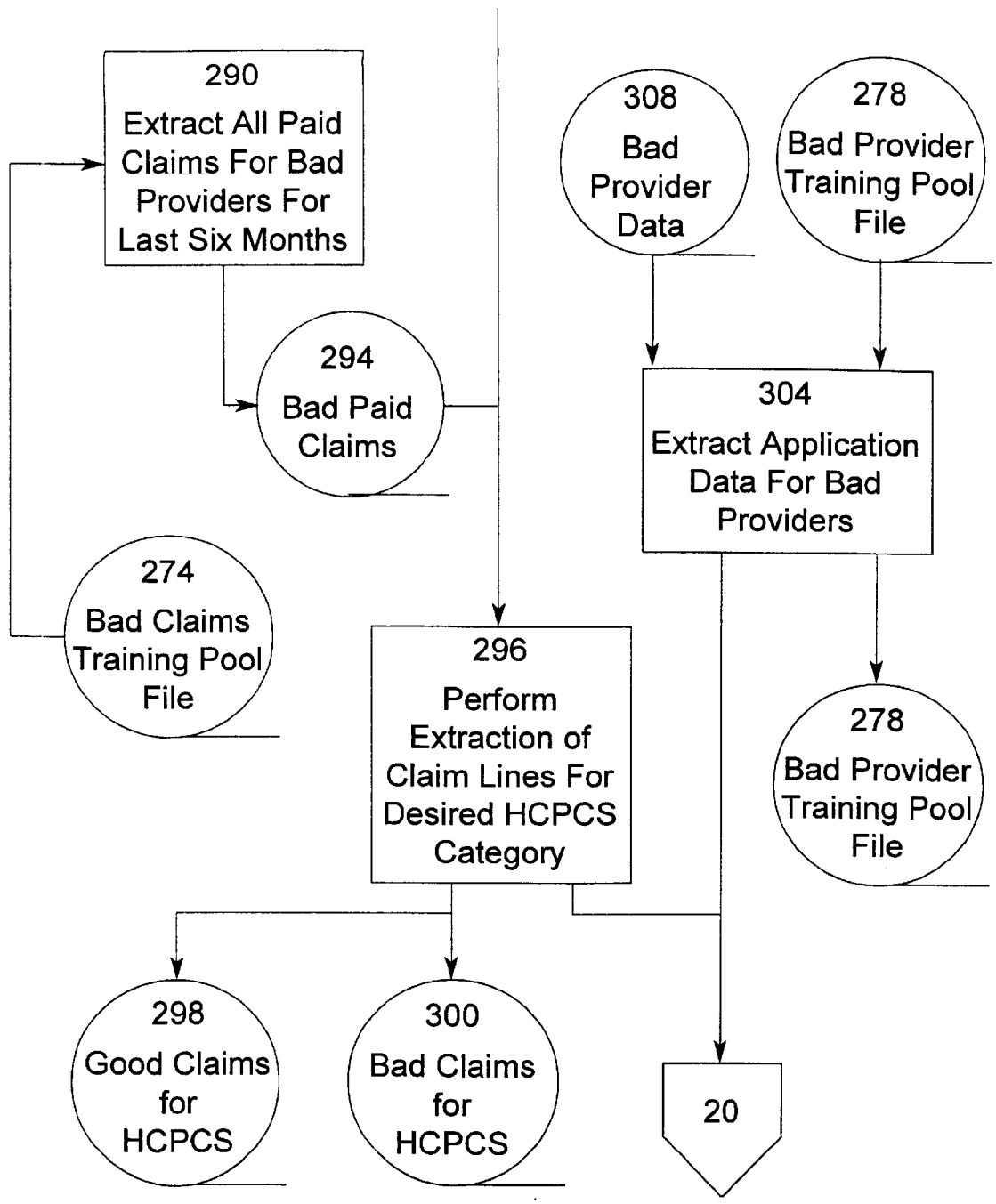

Following the step of training pool identification, the neural network training process continues as illustrated by the flow chart of FIG. 18. With reference to FIG. 18, the first step in this process (represented by block 280) is that of historical data extraction for selected providers or suppliers. This process is illustrated in detail in FIGS. 19–21. With reference to FIG. 19, this portion of the system first determines (block 282) which network is of present interest. Again, the alternatives in this particular embodiment are the claims analysis network (block 284) and the provider physical characteristics network (block 286). With reference to the claims analysis network, the system first extracts all paid claims for good providers for a preceding period of time (e.g., 6 months) from good claims training pool 272. This operation is generally represented by block 288. A similar extraction operation occurs (block 290) with reference to data contained on bad claims training pool 274. Two files (292 and 294) are created reflecting the good and bad paid claims. Data is then extracted from these files for desired categories (for instance, claims corresponding to desired HCPCS categories). This operation is represented by block 296. The resulting data is compiled in files 298 and 300 for good and bad claims, respectively. A similar process on the provider physical characteristics side of FIG. 19 is represented by blocks 302 and 304. This process produces good provider data file 306 and bad provider data file 308.

Figure 20:
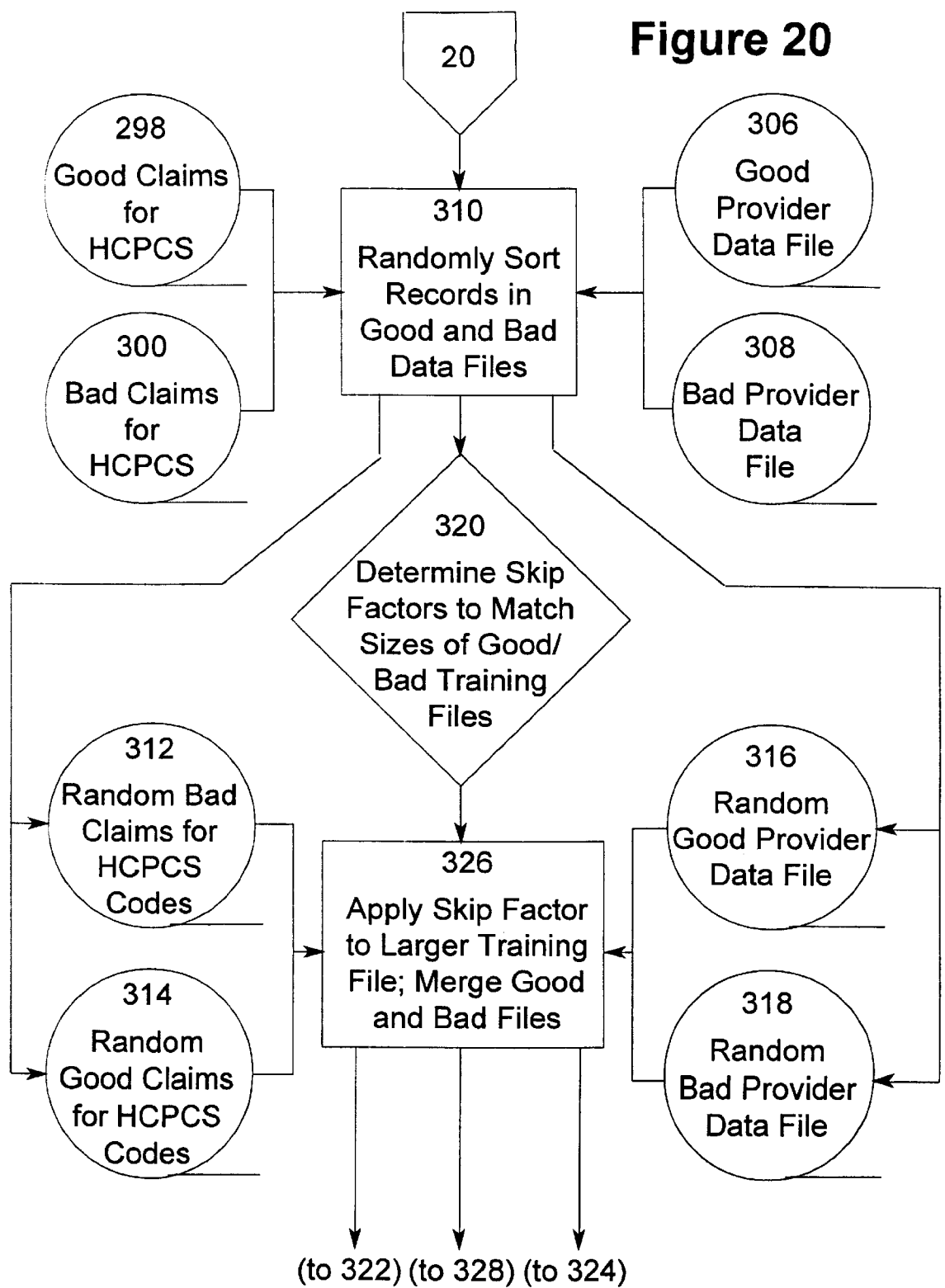
FIG. 20 is a continuation of FIG. 19.
Figure 20:
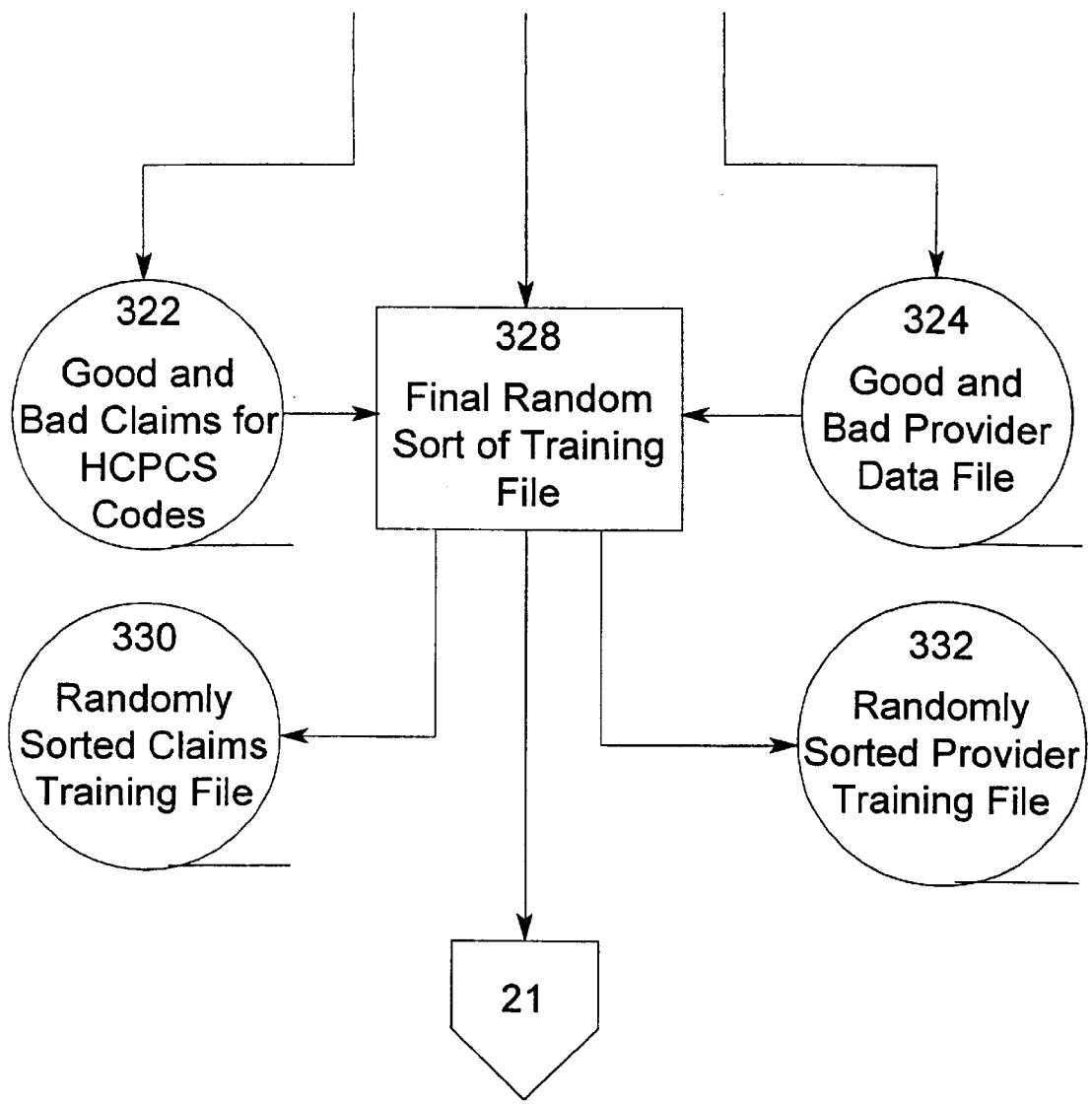

With reference to FIG. 20, data from good and bad claims files 298 and 230 and good and bad provider files 306 and 308 are randomly sorted in an operation illustrated by block 310 to produce random bad claims file 312, random good claims data file 314, random good provider data file 316 and random bad provider data file 318. A skip factor is then determined (block 320) based on the relative sizes of the good and bad training files. For example, if the good training file is twice as large as the bad training file, a skip factor of 2 is utilized. The skip factor is then applied to the larger training file (i.e., for a skip factor of 2, every other piece of data is selected from the larger file) and the good and bad files are merged to form single good and bad claims data file 322 and good and bad provider data file 324. These operations are represented by block 326. A final random sort of each training file then occurs (block 328) to produce the final claims training file 330 and provider training file 332.

Figure 21:
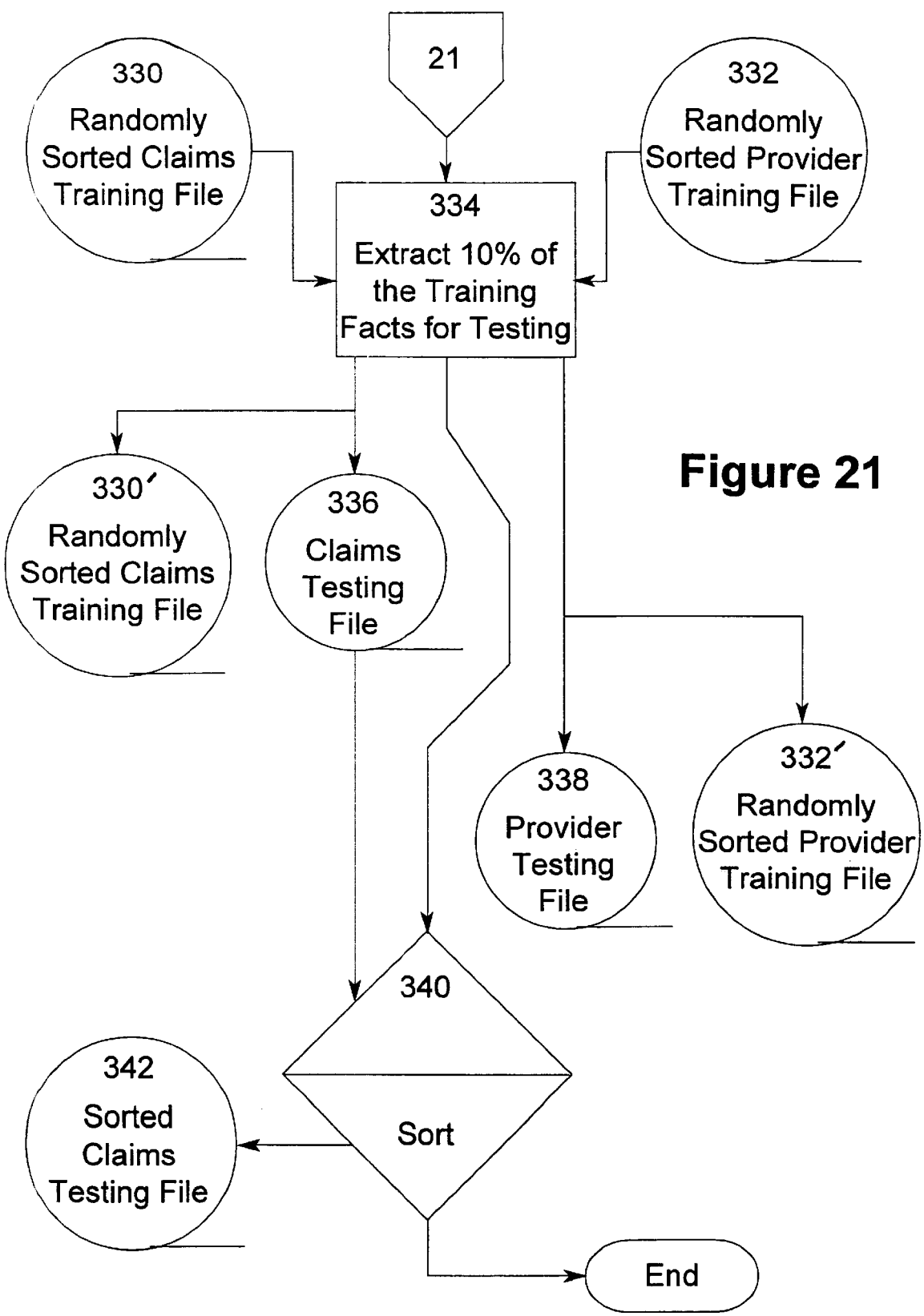
FIG. 21 is a continuation of FIG. 20.

With reference to FIG. 21, an operation represented by block 334 is performed to extract 10% of the training facts from each of claims training file 330 and provider training file 332 to create claims testing file 336 and provider testing file 338. The remaining 90% of the facts comprise claims training file 330' and provider training file 332'. Claims testing file 336 is then sorted by provider number in an operation represented by block 340 to produce sorted claims testing file 342.

As noted, FIGS. 19–21 illustrate the process of historical data extraction represented by block 280 in FIG. 18. Following this process, claims and provider training files 330' and 332' are encoded using encoding lookup tables 252 produced by the process illustrated in FIG. 16. The encoding process is represented by block 344. This process produces encoded claims and provider training files 346 and 347 and, optionally, written report 348. The same encoding process is applied to sorted claims testing file 342 and provider testing file 338, in an operation represented by block 354, to produce encoded claims testing data file 356 and encoded provider testing file 357. Optional report 358 may also be generated, if desired.

Following the processes of encoding the training and testing data, the neural networks are created. This process, which is illustrated generally in FIG. 18 by blocks 360 and 361, utilizes a commercially available software package known as NeuralWorks which is available from NeuralWare of Pittsburgh, Pennsylvania. As used in this application, the processes of blocks 360 and 361 are generally illustrated by the flow chart of FIG. 22.

Figure 22:
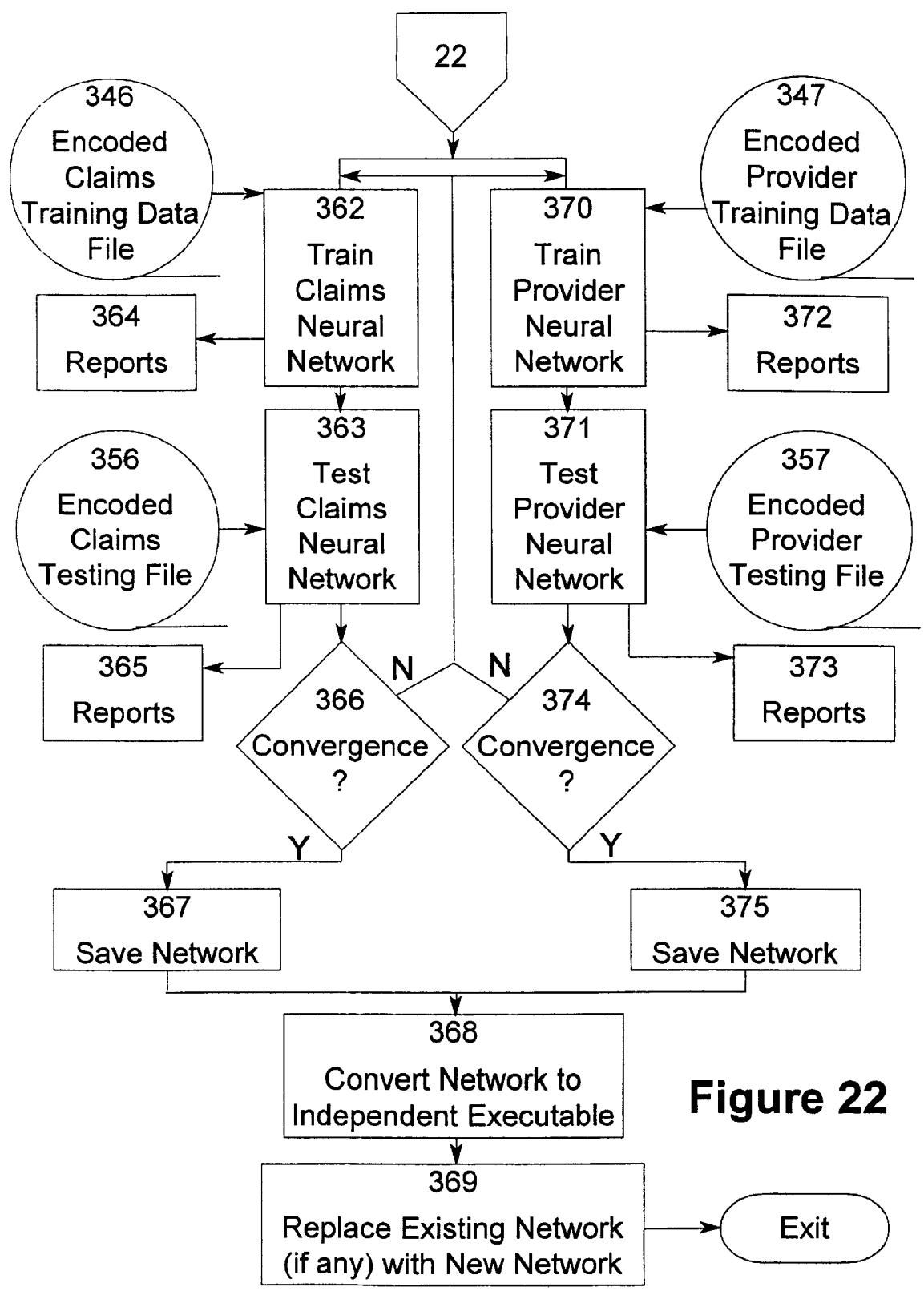
FIG. 22 is a continuation of FIG. 18.

Blocks 362 and 363 of FIG. 22 illustrate the processes of training and testing the claims neural network, using data files 346 and 356, respectively. Optional reports 364 and 365 may be produced in the training and testing processes, if desired. Training and testing proceed until convergence is achieved (block 366). The network is then saved (block 367) and converted to an independent executable program (block 368). If a previous version of the network exists, which will be the case if the process just described occurs as part of a periodic updating or training exercise, the existing network is replaced with the newly trained and tested network (block 369) to complete the update process.

A similar process is represented for the provider neural network on the right side of FIG. 22. The training and testing processes are represented by blocks 370 and 371, respectively. These processes proceed using data from files 347 and 357, as illustrated. Optional reports 372 and 373 may be produced, if desired. As with the claims neural network process illustrated on the left side of FIG. 22, processing continues until the network converges (block 374), after which the new or updated network is saved (block 375).

FIG. 23 illustrates a portion of a report of the type which might be produced by the method and apparatus of the present invention. The report of FIG. 23 shows those suppliers whose aggregate fraud indicator exceeded the current threshold (in this case 0.4500). The report also details the total number of claim lines examined, total providers (suppliers), and the number of "good" and "bad" suppliers identified by the network. In addition, the report also indicates the number of claim lines which were examined to determine the fraud indicators for those suppliers exceeding the threshold.

Figure 24:
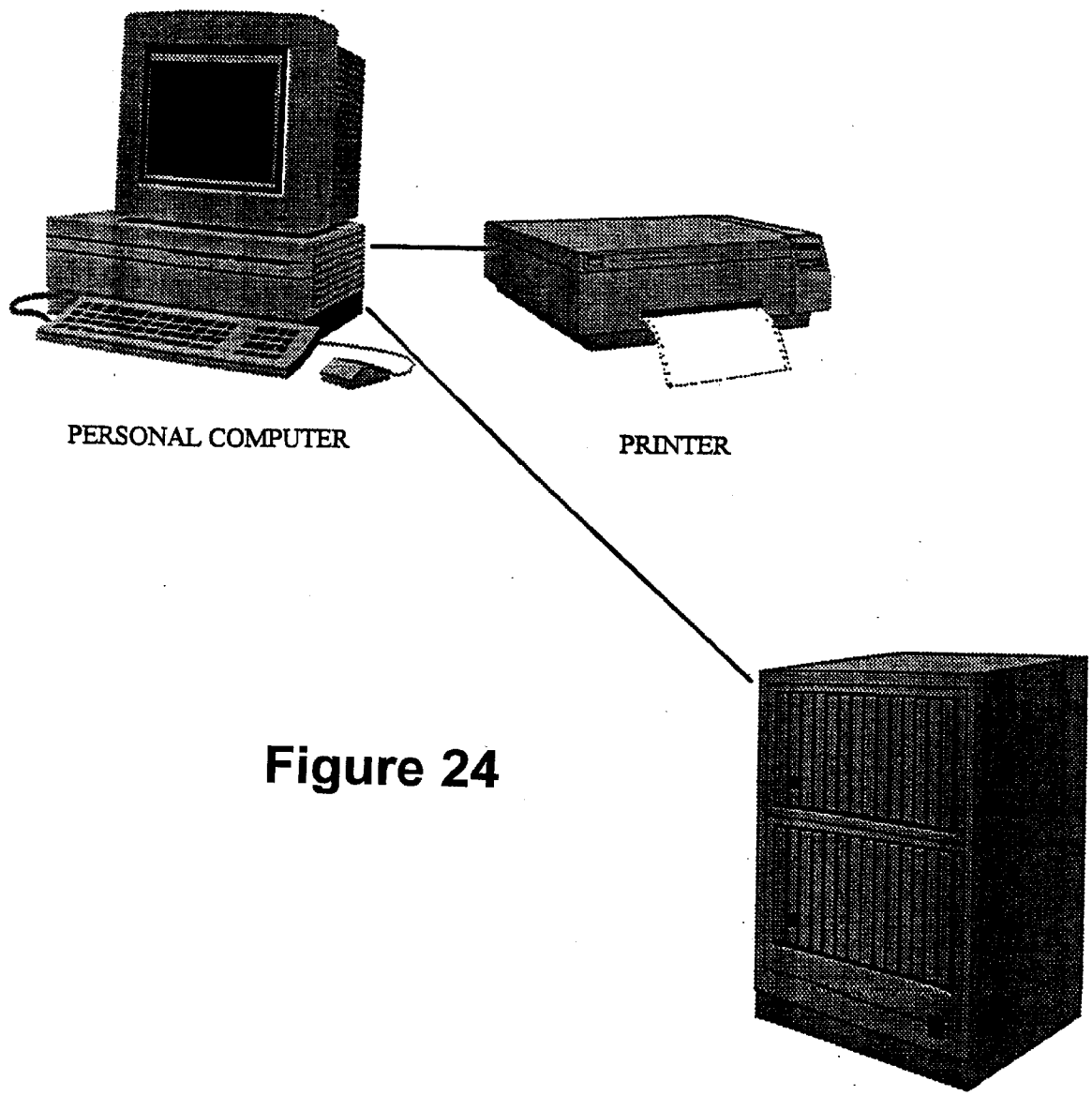
FIG. 24 illustrates a generalized computer system suitable for use with the present invention.

FIG. 24 illustrates a generalized computer system of the type with which the present invention may be used. FIG. 24 shows a personal computer with attached printer for running the neural network and statistical applications and producing reports. This diagram also shows a main frame computer system and storage devices used to extract claims data from an existing claims processing system.

From the preceding description of the above embodiment, it is evident that the goals of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A computerized method for analyzing the billing patterns of a plurality of providers and suppliers of goods and services, and for identifying potentially fraudulent providers and suppliers, comprising the steps of:
   a. training a neural network to recognize patterns associated with fraudulent billing activity by providers and suppliers of goods and services;
   b. collecting data from said plurality of providers and suppliers, including claims data relating to claims submitted for payment by said providers and suppliers;
   c. extracting adjudicated line data from said claims data to construct a claim file;
   d. analyzing the line data in the claim file by means of the neural network to produce a numerical fraud indicator for at least one of said providers and suppliers;
   e. comparing the fraud indicator to a predetermined threshold indicator value;
   f. storing an identifier associated with each provider or supplier whose fraud indicator exceeds the predetermined threshold indicator value;
   g. analyzing data relating to each of the providers or suppliers whose identifiers were stored in step f, using an expert system inference engine in accordance with a plurality of expert system rules, to identify potentially fraudulent providers or suppliers; and
   h. producing a report which displays the identities of the potentially fraudulent providers or suppliers.

2. The method of claim 1, comprising the additional step of using the report to initiate further investigation of the potentially fraudulent providers or suppliers identified in step g.

3. The method of claim 1, further comprising the additional steps of examining previously stored statistical information relating to each provider or supplier whose fraud indicator exceeds the predetermined threshold indicator value, and storing results of the examination in a utilization screening file.

4. The method of claim 3, comprising the additional step of preparing a report displaying the results of the examination of previously stored statistical information.

5. The method of claim 1, wherein the data analyzed in step g includes data from at least one of a physical traits analysis file, a statistical screening file, and a utilization screening file.

6. The method of claim 1, comprising the additional steps of periodically updating and training the neural network, and periodically refining the expert system rules.

7. The method of claim 1, further comprising the step of determining whether the neural network has been trained to analyze a particular item of line data by examining an HCPCS code associated with said data.

8. The method of claim 1, further comprising the step of determining whether or not a decision has been made to pay an adjudicated line from the claim file, and analyzing (step d) only those lines for which a decision to pay has been made.

9. The method of claim 1, wherein the step of analyzing the line data (step d) further includes the steps of:
   d(1). selecting elements of information from the data stored in the claim file;
   d(2). encoding the selected elements of information to produce an encoded claim file; and
   d(3). storing the encoded claim file.

10. The method of claim 9, further comprising the step of sorting the encoded claim file by supplier or provider to produce a sorted encoded claim file.

11. The method of claim 10, wherein the step of analyzing the line data (step d) further comprises the steps of:

d(4). reading data from the sorted encoded claim file; and d(5). analyzing the data from the sorted encoded claim file by means of the neural network to produce the fraud indicator for the selected supplier or provider.

12. The method of claim 11, wherein the step of analyzing data (step d(5)) includes the steps of:

d(5)(a). producing a plurality of fraud indicators based on a plurality of claims submitted by the selected supplier or provider; and d(5)(b). computing a composite fraud indicator for the selected supplier or provider.

13. The method of claim 12, wherein the step of computing a composite fraud indicator includes averaging the plurality of fraud indicators for the selected provider or supplier.

14. The method of claim 13, wherein the comparing step includes the step of comparing the composite fraud indicator to the predetermined threshold indicator value.

15. The method of claim 1, comprising the additional step of storing data relating to the identified potentially fraudulent suppliers or providers in at least one of a database file and a statistics file.

16. The method of claim 1, wherein the step of analyzing data (step g) relating to each of the suppliers or providers whose identities were stored in step f comprises at least one of the additional steps of:

g(1). analyzing previously stored statistical information relating to the subject supplier or provider;

g(2). analyzing, by use of a neural network, previously stored physical characteristics relating to the subject provider or supplier; and g(3). analyzing statistical utilization data relating to the subject supplier or provider.

17. The method of claim 16, wherein at least one of the analysis of previously stored statistical information, the analysis of physical characteristics, and the analysis of statistical utilization data include an analysis by means of an expert system.

18. The method of claim 17, further comprising the additional step of periodically refining a set of rules associated with the expert system in response to data relating to fraudulent suppliers or providers detected by the computerized method.

19. The method of claim 16, further comprising the additional step of periodically updating the neural network used to perform the analysis of supplier or provider physical characteristics.

20. The method of claim 1, comprising the additional step of preparing a report which displays at least one of:

a. the total number of claim lines examined;

b. the total providers or suppliers analyzed;

c. the number of potentially fraudulent providers or suppliers identified; and d. the number of claim lines examined to produce the fraud indicators for those providers or suppliers whose fraud indicators exceeded the predetermined threshold indicator.

21. A computer system for analyzing the billing patterns of a plurality of providers and suppliers of goods and services, and for identifying potentially fraudulent providers and suppliers, comprising:

a processor;

a storage device for storing a claims data file, and a neural network program trained to recognize patterns associated with fraudulent billing activity by providers and suppliers of goods and services;

input means for receiving data from said plurality of providers and suppliers, including claims data relating to claims submitted for payment by said providers and suppliers, and for communicating said data to the processor and storage device;

means for extracting adjudicated line data from said claims data and for constructing said claims data file from said line data;

means for analyzing the line data in the claims data file by means of the neural network to produce a numerical fraud indicator for at least one of said providers and suppliers;

means for comparing the fraud indicator to a predetermined threshold indicator value;

means for storing an identifier associated with each provider or supplier whose fraud indicator exceeds the predetermined threshold indicator value;

means for analyzing data relating to each of the providers or suppliers whose identifiers were stored to identify potentially fraudulent providers or suppliers, said means comprising an expert system inference engine programmed in accordance with a plurality of expert system rules; and means for producing a summary report which displays the identities of the potentially fraudulent providers or suppliers.

22. A computer system according to claim 21, wherein said storage device further comprises a neural network database file for storing data relating to the potentially fraudulent suppliers or providers.

23. A computer system according to claim 22, wherein said storage device further comprises a statistics file for storing statistical data relating to a supplier or provider.

24. A computer system according to claim 23, wherein said storage device further comprises a statistical screening file containing data from the neural network database file and the statistics file.

25. A computer system according to claim 22, wherein said storage device further comprises a supplier/provider application file for storing data relating to the physical characteristics of a supplier or provider.

26. A computer system according to claim 25, wherein said storage device further comprises a physical traits analysis file containing data from the neural network database file and the supplier/provider application file.

27. A computer system according to claim 25, wherein said storage device further comprises encoding lookup tables for use with the supplier/provider application file to produce an encoded supplier/provider application data file.

28. A computer system according to claim 27, further comprising means for analyzing the data in the encoded supplier/provider application data file to produce a physical traits analysis file.

29. A computer system according to claim 22, wherein said storage device further comprises a supplier/provider application database for storing information relating to supplier/provider utilization.

30. A computer system according to claim 29, wherein said storage device further comprises a utilization screening file containing data from the neural network database file and the supplier/provider application database.

31. A computer system according to claim 21, wherein said means for analyzing includes means for conducting a fuzzy logic analysis to produce a fraud prediction relating to the identified supplier or provider.

32. A computer system according to claim 21, further comprising means for training the neural network program.

33. Apparatus for detecting potentially fraudulent suppliers or providers of goods or services, comprising:
- a processor;
- a storage device;
- input means for communicating data from an input device to the processor and storage device; and
- output means for communicating data from the processor storage device to an output device;
- said storage device further comprising:
  - a neural network database file for storing data relating to potentially fraudulent suppliers or providers;
  - at least one of: (I) a physical traits analysis file for storing application data relating to a plurality of suppliers and providers; (ii) a statistical screening file for storing statistical data relating to potentially fraudulent suppliers or providers; and (iii) a utilization screening file for storing historical data relating to a plurality of suppliers or providers;
- means for processing information from the neural network database file and at least one of the physical traits analysis file, the statistical screening file and the utilization screening file to identify potentially fraudulent suppliers or providers; and
- means for producing a summary report which displays the identities of the potentially fraudulent suppliers or providers.

34. Apparatus according to claim 33, wherein said means for processing comprises an expert system, and wherein said storage device further contains a plurality of expert system rules.

35. Apparatus according to claim 33, further comprising means for updating at least one of the physical traits analysis file, the statistical screening file and the utilization screening file.

36. Apparatus according to claim 33, further comprising means for analyzing data stored in the storage device and for producing and updating the neural network database file.

* * * * *